(12) United States Patent
Murakami

(10) Patent No.: US 9,025,931 B2
(45) Date of Patent: May 5, 2015

(54) RECORDING APPARATUS, RECORDING METHOD, AND PROGRAM

(71) Applicant: Canon Kabushiki Kaisha, Tokyo (JP)

(72) Inventor: Naoyuki Murakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/106,023

(22) Filed: Dec. 13, 2013

(65) Prior Publication Data

US 2014/0169753 A1 Jun. 19, 2014

(30) Foreign Application Priority Data

Dec. 19, 2012 (JP) ................................. 2012-276875

(51) Int. Cl.
| | |
|---|---|
| *H04N 5/92* | (2006.01) |
| *H04N 9/804* | (2006.01) |
| *H04N 5/77* | (2006.01) |
| *H04N 9/806* | (2006.01) |
| *H04N 9/82* | (2006.01) |

(52) U.S. Cl.
CPC ............. *H04N 9/8042* (2013.01); *H04N 5/772* (2013.01); *H04N 9/8063* (2013.01); *H04N 9/8205* (2013.01)

(58) Field of Classification Search
USPC ................................. 386/239–241, 248, 285
See application file for complete search history.

(56) References Cited

U.S. PATENT DOCUMENTS

2002/0015581 A1* 2/2002 Ando et al. ...................... 386/95
2013/0188922 A1* 7/2013 Furbeck et al. ............... 386/239

FOREIGN PATENT DOCUMENTS

JP 2008-283232 A 11/2008

* cited by examiner

*Primary Examiner* — Hung Dang
*Assistant Examiner* — Mishawn Dunn
(74) *Attorney, Agent, or Firm* — Carter, DeLuca, Farrell & Schmidt, LLP

(57) ABSTRACT

A recording apparatus codes moving image data on a unit basis of a moving image sample corresponding to a first period, codes the audio data on a unit basis of an audio sample corresponding to a second period, stores the coded moving image data and audio data in a moving image file and records the moving image data and the audio data in a recording medium, determines based on a recording start position of the obtained moving image data, a recording start position of the obtained audio data to be a position preceding the recording start position of the obtained moving image data by at least the audio sample corresponding to the second period, and determines a reproduction start position of the recorded audio data to be a position following a head of the recorded audio data by the unit of the audio data.

14 Claims, 17 Drawing Sheets

FIG. 5A

| trak1(video) | stco1 | V1 | O1 |
|---|---|---|---|
| | | V2 | O3 |
| trak2(audio) | stco2 | A1 | O2 |
| | | A2 | O4 |

FIG. 5B

| trak1(video) | stco1 | V1 | O1 |
|---|---|---|---|
| trak2(audio) | stco2 | A1 | O2 |

FIG. 5C

| trak1(video) | stco1 | V1 | O1 |
|---|---|---|---|
| | | V2 | O3 |
| trak2(audio) | stco2 | A1 | O2 |
| | | A2 | O41 |

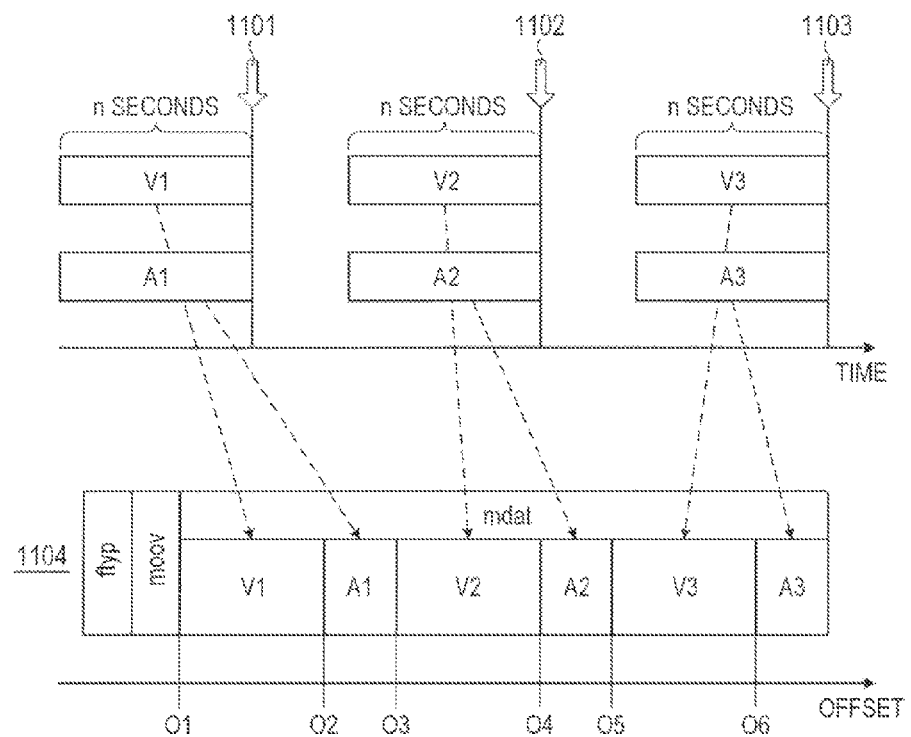

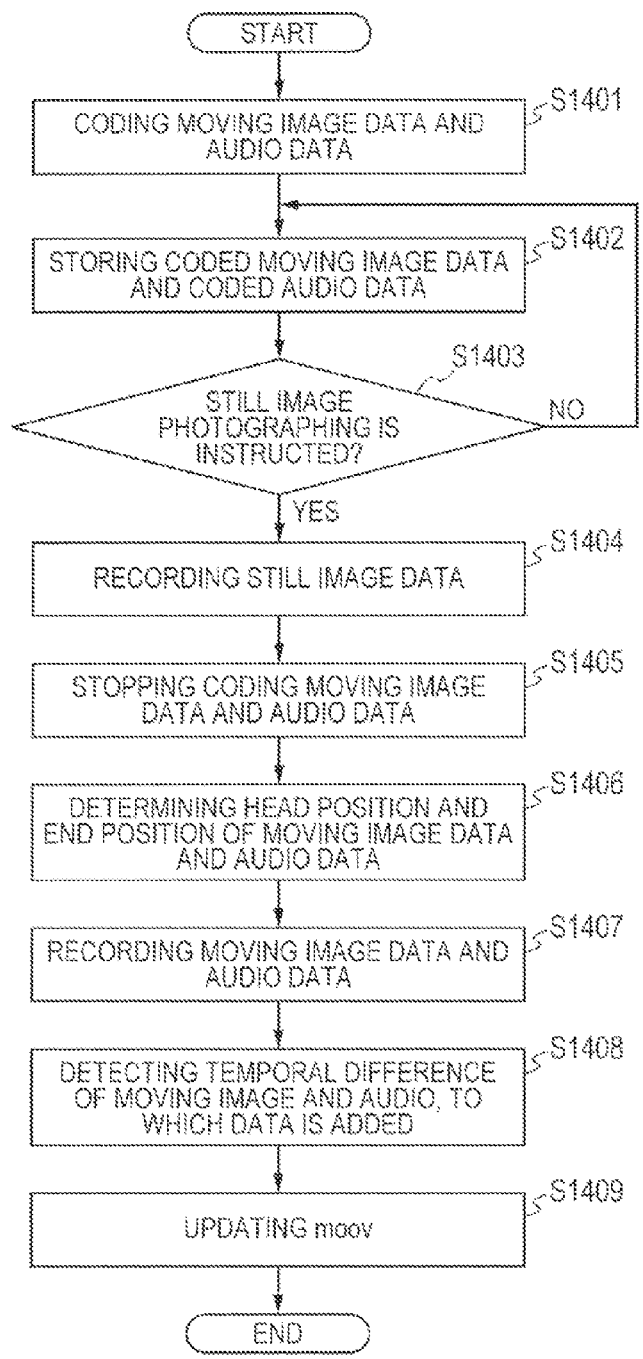

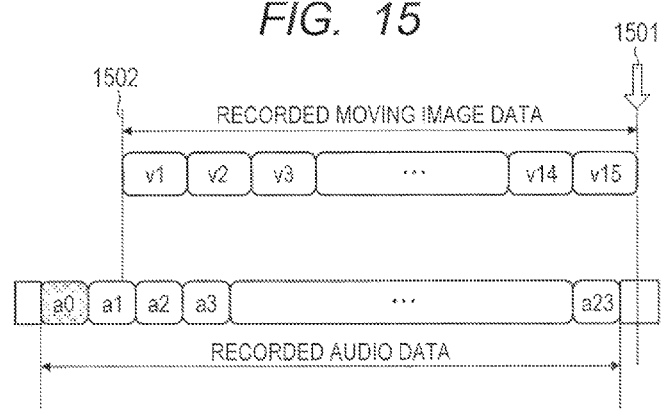
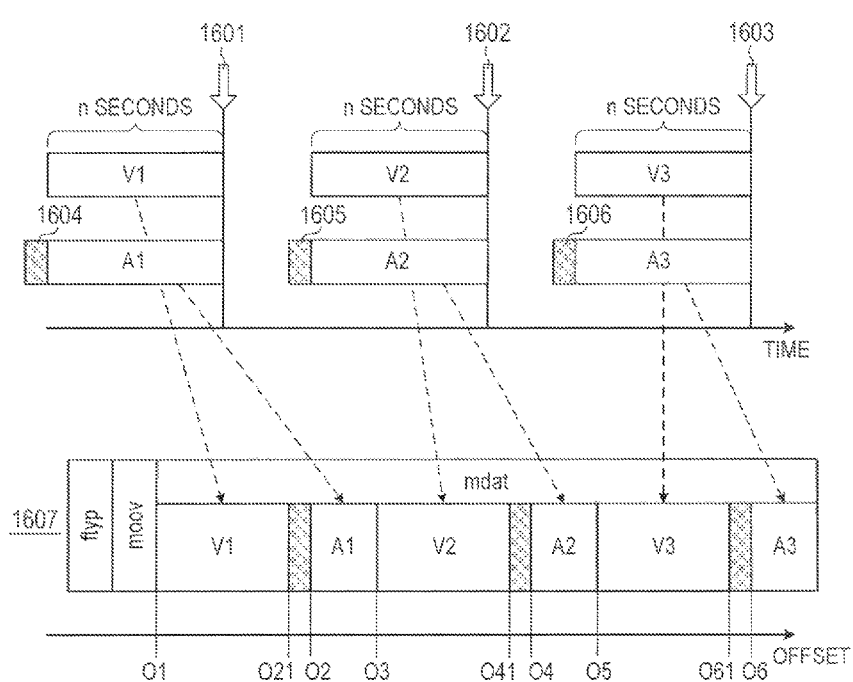

y1 = x2 y1 > x2
AND
(y1 - x2) + y2 > ONE AAU TIME y1 > x2
AND
(y1 - x2) + y2 < ONE AAU TIME y1 < x2
AND
(x2 - y1) - y2 > 0 y1 < x2
AND
(x2 - y1) - y2 ≤ 0

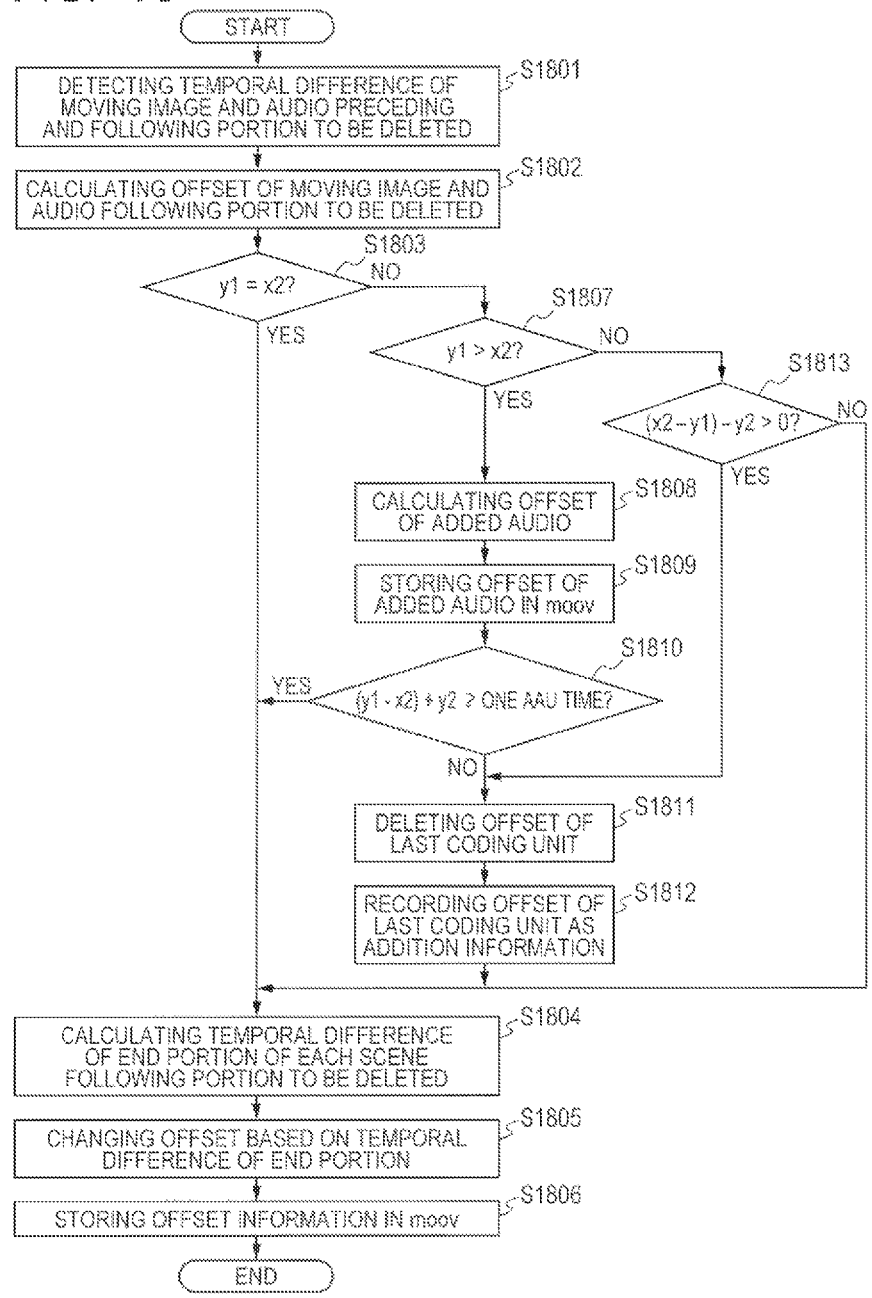

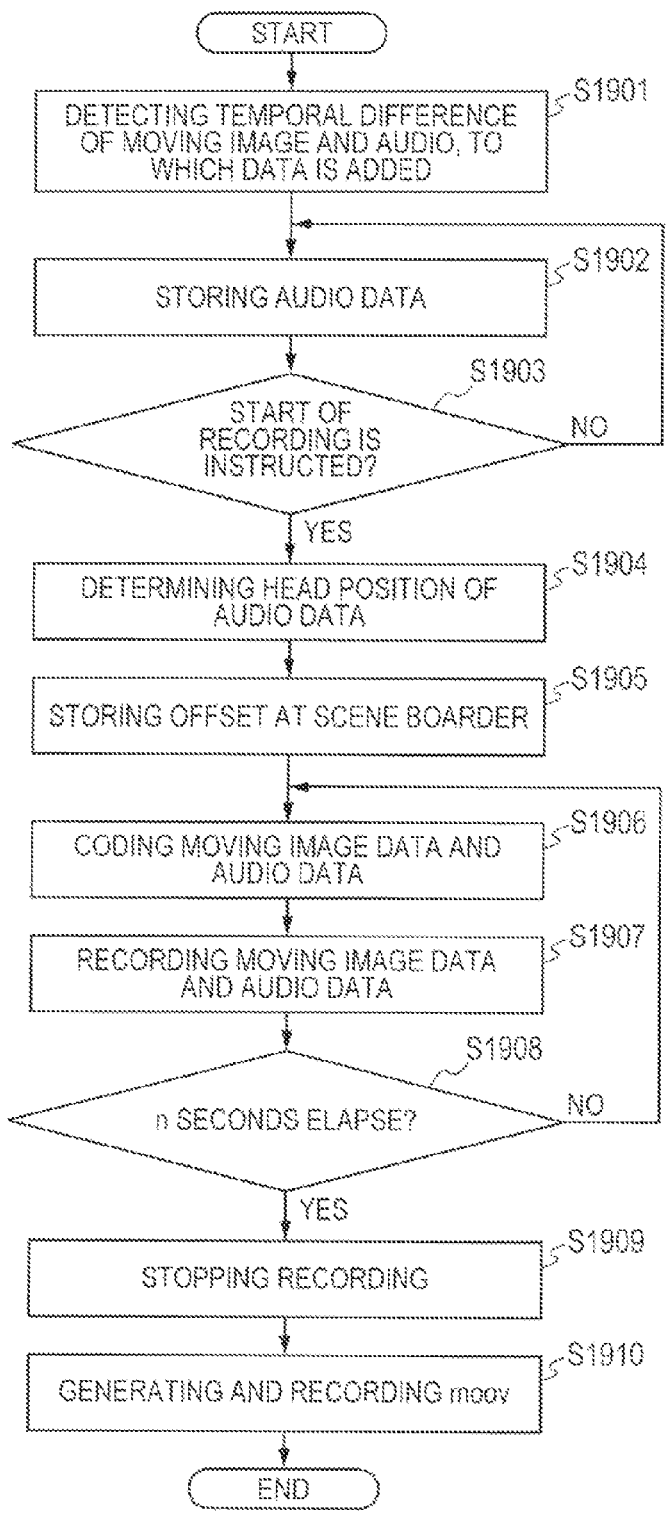

RECORDING APPARATUS, RECORDING METHOD, AND PROGRAM

BACKGROUND OF THE INVENTION

1. Field of the Invention

The present invention relates to a recording apparatus, and more particularly, to a recording apparatus that codes moving images and audio sounds, and records the coded moving images and audio sounds.

2. Description of the Related Art

There has hitherto been known a recording apparatus that records moving image signals and audio signals on a recording medium. This type of recording apparatus manages a recorded moving image and audio sound as a file in accordance with a predetermined file system. An MP4 file format is known as a file format for recording moving images and audio sounds (see, for example, Japanese Patent Application Laid-Open No. 2008-283232).

Unit times of respectively coding moving images and audio sounds which are recorded in the MP4 file format differ from each other. Therefore, it is rare that the timing for sampling a moving image matches the timing for sampling an audio sound in an end portion of one scene. In most cases, a sample point for the end of a moving image differs from a sample point for the end of an audio sound.

In a case where an editing process of combining a moving image and an audio sound stored in two MP4 files to create a new MP4 file is executed, therefore, the moving image and audio sound are combined with sample points being not coincident.

The MP4 file format is not designed to set a time period during which reproduction is not performed, halfway in data form, and hence all pieces of data are continuously reproduced from the head of the file. When the sample point for a moving image is not coincident with the sample point for an audio sound at the border of scenes, therefore, the reproduction timing for the moving image is undesirably not coincident with the reproduction timing for the audio sound after the border of combination.

SUMMARY OF THE INVENTION

In view of the above-mentioned problem, it is an aspect of the present invention to prevent unnatural reproduction due to the non-coincidence between reproduction timings for a moving image and an audio sound, when a file storing coded moving image data and audio data is combined with another moving image data and another audio data.

According to one embodiment of the present invention, there is provided a recording apparatus for recording moving image data obtained by a moving-image obtaining unit and audio data obtained by an audio obtaining unit as a moving image file on a recording medium, including: a coding unit that codes the obtained moving image data in accordance with a unit of coding which is a moving image sample corresponding to a first period, and coding the obtained audio data in accordance with a unit of coding which is an audio sample corresponding to a second period; a recording unit that stores the moving image data and audio data coded by the coding unit in the moving image file and records the moving image data and the audio data in the recording medium; and a control unit that determines, based on a recording start position of the obtained moving image data, a recording start position of the obtained audio data to be a position preceding the recording start position of the obtained moving image data by at least the audio sample corresponding to the second period, and determines a reproduction start position of the recorded audio data to be a position following a head of the recorded audio data by the unit of coding of the audio data.

It is possible to prevent unnatural reproduction due to the non-coincidence between the reproduction timings for the moving image and the audio sound, when the file storing the coded moving image data and audio data is combined with another moving image data and another audio data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A, 5B and 5C are diagrams each illustrating management information on a moving image file illustrated in FIG. 4.

FIG. 11 is a diagram illustrating the structure of moving image data and audio data additionally written in a moving image file.

FIG. 12 is a diagram illustrating management information on the moving image file illustrated in FIG. 11.

FIG. 14 is a flowchart illustrating the operation of the recording apparatus according to the embodiment of the present invention in a simultaneous recording mode.

FIG. 15 is a diagram illustrating an operation of determining the head position of audio data in the simultaneous recording mode according to the embodiment of the present invention.

FIG. 16 is a diagram illustrating the structures of moving image data and audio data that are recorded in the simultaneous recording mode according to the embodiment of the present invention.

FIG. 18 is a flowchart illustrating the partially deleting operation of the recording apparatus according to the embodiment of the present invention.

FIG. 19 is a flowchart illustrating the operation of the recording apparatus according to the embodiment of the present invention in an additionally writing mode.

DESCRIPTION OF THE EMBODIMENTS

Various exemplary embodiments, features, and aspects of the present invention will be described in detail below with reference to the drawings.

Figure 1:
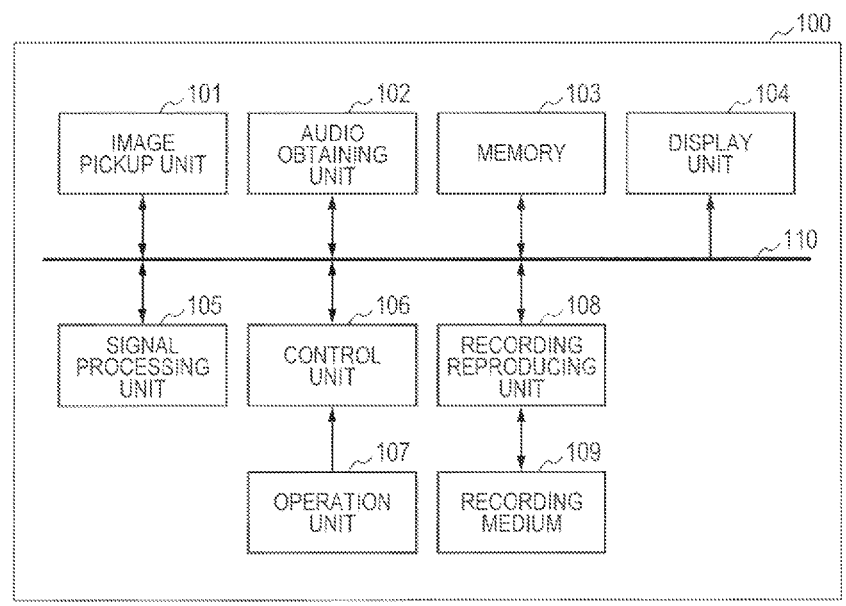
FIG. 1 is a block diagram illustrating an example of the configuration of a recording apparatus according to an embodiment of the present invention.

FIG. 1 is a block diagram illustrating an example of the configuration of a recording apparatus 100 according to an embodiment of the present invention. Although this embodiment is an example in which an image pickup apparatus such as a video camera to which the present invention is applied, this embodiment can be applied to a personal computer (PC) that has a camera and a microphone, or is connected thereto, or an apparatus capable of a moving image photographing such as a portable device like a smartphone.

Referring to FIG. 1, an image pickup unit 101 functions as a moving image obtaining unit including a known image pickup element and AD converter. The image pickup unit 101 picks up an image of a subject and outputs moving image data. An audio obtaining unit 102 includes a microphone and an AD converter. The audio obtaining unit 102 obtains audio sounds around a subject, and outputs audio data.

A memory 103 stores moving image data and audio data. The individual blocks of the recording apparatus 100 accesses the memory 103 to process moving image data and audio data. The memory 103 stores various kinds of information such as information on a file system, and management information in addition to moving image data and audio data. The memory 103 also serves as a work memory or the like for the control operation of a control unit 106. In a case where a simultaneous recording mode is set as described later, moving image data and audio data of a predetermined time are repeatedly stored in the memory 103 in a recording standby state.

A display unit 104 displays a moving image obtained by the image pickup unit 101 in a photographing mode, and displays a reproduced moving image in a reproduction mode. The display unit 104 also displays various kinds of information such as menu screens.

In recording a moving image, a signal processing unit 105 codes moving image data obtained by the image pickup unit 101 and audio data obtained by the audio obtaining unit 102 in accordance with a known coding format to compress an information amount of the data. Further, the signal processing unit 105 executes a process necessary for recording moving image data and audio data. According to this embodiment, moving image data is coded in accordance with H.264/Advanced Video Coding (AVC), and audio data is coded in accordance with Advanced Audio Coding (AAC). The signal processing unit 105 decodes reproduced moving image data and audio data in a reproduction mode to expand an information amount of the data.

In recording a still image, the signal processing unit 105 also codes a still image data of one frame obtained by the image pickup unit 101, in accordance with a known coding system such as JPEG. In reproducing a still image, the signal processing unit 105 decodes reproduced still image data.

The control unit 106 controls the general operation of the recording apparatus 100 in accordance with an input from an operation unit 107. The control unit 106 includes a microcomputer (CPU) and a memory, and controls the recording apparatus 100 in accordance with a computer program (software) stored in a nonvolatile memory (not shown). The control unit 106 incorporates a recording medium interface for communicating data and commands to/from a recording reproducing unit 108. The operation unit 107 includes various switches that are operable by a user. The operation unit 107 receives various instructions or the like given by the user, and notifies the control unit 106 of the instructions or the like. The operation unit 107 includes a power switch, switches for giving an instruction for start and stop of recording, and a switch for changing the mode of the recording apparatus 100.

The recording reproducing unit 108 writes or reads moving image data and audio data or various kinds of information in or from a recording medium 109. In a recording mode, the recording reproducing unit 108 writes moving image data and audio data, which are stored in the memory 103, in the recording medium 109. In the reproduction mode, the recording reproducing unit 108 reads moving image data and audio data from the recording medium 109, and stores the moving image data and audio data in the memory 103. According to this embodiment, the recording medium 109 is a random accessible recording medium, such as a hard disk (HDD) or a flash memory card.

The recording reproducing unit 108 manages moving image data and audio data, or various kinds of information to be recorded in the recording medium 109 as a file in accordance with a file system such as File Allocation Table (FAT). The recording reproducing unit 108 includes a known interface (IF) such as AT Attachment (ATA) to communicate data and various commands to/from a recording medium IF in the control unit 106. Although the recording medium 109 is configured to be easily loadable into or unloadable from the recording apparatus 100 by a loading and unloading mechanism (not shown), the recording medium 109 may be configured to be incorporated into the recording apparatus 100.

In writing or reading a moving image file containing moving image data and audio data in or from the recording medium 109, the control unit 106 controls the recording reproducing unit 108 to reproduce file system data (management data) from the recording medium 109, and store the file system data in the memory 103. The file system data indicates, for example, the file name of data recorded on the recording medium 109, the size of a file recorded thereon, an address at which the data is recorded, and is information for managing files. The control unit 106 controls file writing and reading in accordance with the read file system data. The control unit 106 updates the file system data stored in the memory 103 in accordance with the writing of a file in the recording medium 109. The control unit 106 causes the recording reproducing unit 108 to record the updated file system data in the recording medium 109.

A data bus 110 is used to transmit and receive data and various control commands among the individual units of the recording apparatus 100.

Figure 2A:
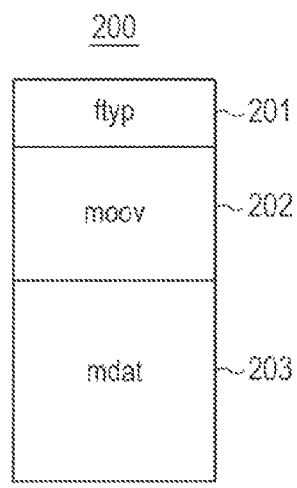
FIGS. 2A and 2B are diagrams illustrating the structure of a moving image file.

According to this embodiment, moving image data and audio data are recorded on the recording medium 109 in the MP4 file format. FIG. 2A illustrates the basic structure of an MP4 file. An MP4 file 200 is structured by storage unit called box. The topmost box that constitutes a single MP4 file includes an ftyp box 201, a moov box 202, and an mdat box 203. The ftyp box 201 stores file compatibility information, and the moov box 202 stores management information of moving image data and audio data. The mdat box 203 stores real data of coded moving image data and audio data.

Figure 2B:
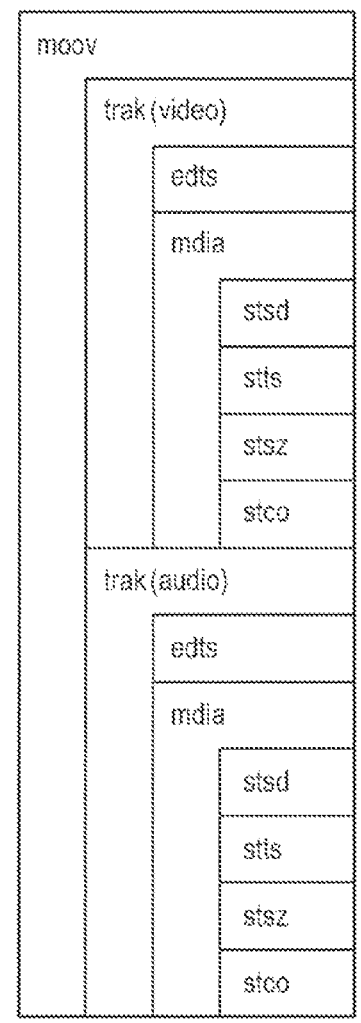

FIG. 2B is a diagram illustrating an example of the structure of the moov box 202. A trak box defines a single piece of moving image data and a single piece of audio data. In FIG. 2B, two traks for respectively defining moving image data and audio data are stored. In each trak, information on a timing of starting reproduction from a track is stored in edts. Information for determining whether a track contains a video (moving image) or audio is stored in stsd. Information on a sustaining time (reproduction duration) of one sample of video or audio data is stored in stts. Information indicating the size of a sample in each chunk is stored in stsz. Information on the offset (data size) of each chunk from the head of a file is stored in stco. In the MP4 file format, moving image data and audio data that are stored in the mdat are each managed by units called "chunk". Such moov data specifies the position of each piece of data stored in the mdat in a file.

Figure 3:
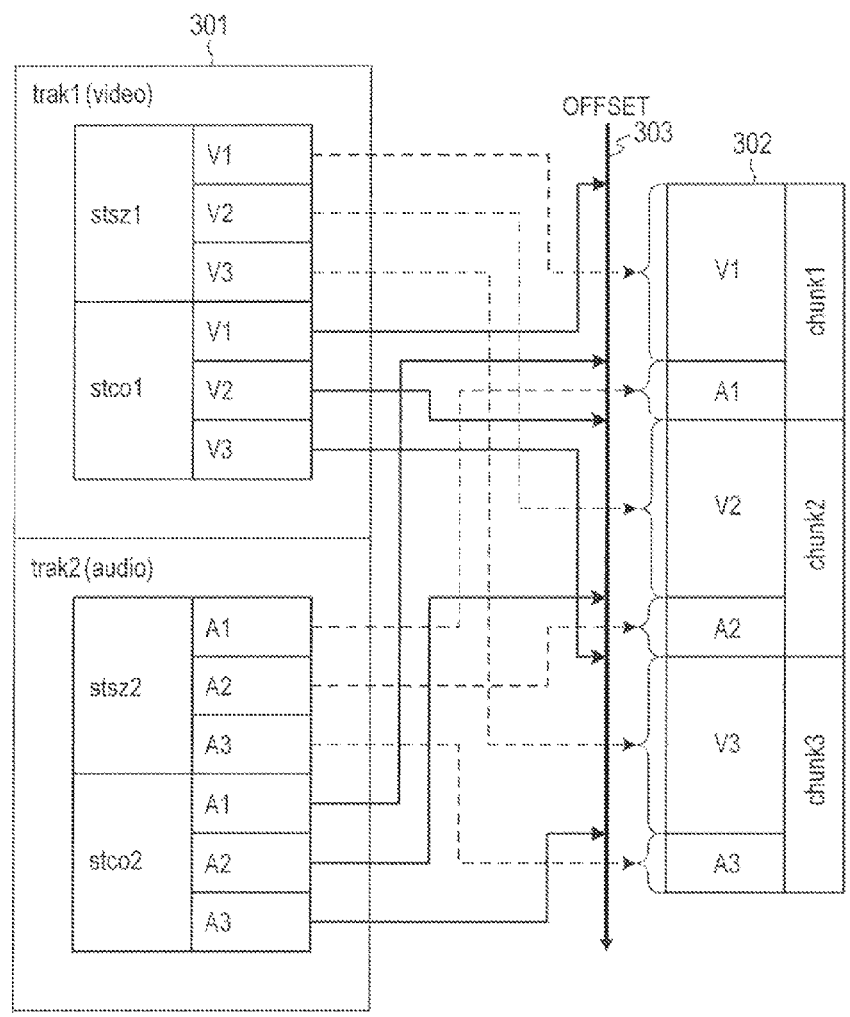
FIG. 3 is a diagram illustrating the correlation among management information, moving image data, and audio data.

FIG. 3 illustrates the correlation between information indicated by the stsz and stco stored in the moov and the offset of data stored in the mdat. A track 1 and a track 2 in a moov box 301 are a track for video data and a track for audio data, respectively. Each track includes three chunks. stsz indicates the numbers and sizes of samples included in video data and audio data stored in a mdat box 302. stco indicates an offset 303 of each video chunk and each audio chunk.

Next, a recording operation in the normal recording mode according to this embodiment is described. The recording apparatus 100 can record moving image data and still image data in the normal recording mode. As described later, the recording apparatus 100 according to this embodiment has a simultaneous recording mode for recording moving image data and audio data of at least a predetermined time as well as recording a still image, and an additionally writing mode for additionally writing moving image data and audio data in a recorded moving image file in addition to the normal recording mode. The recording apparatus 100 also has a reproduction mode for reproducing moving image files recorded in those recording modes. In the reproduction mode, an instruction to combine moving image files, and an instruction to partially delete a moving image file recorded in the simultaneous recording mode can be given.

When receiving an instruction for the normal recording mode from the operation unit 107, the control unit 106 sets the recording apparatus 100 in a recording standby state, and waits for an instruction to start recording. In the recording standby state, the control unit 106 displays a moving image associated with moving image data input from the image pickup unit 101 on the display unit 104. If the instruction to start recording is input from the operation unit 107, the control unit 106 instructs the signal processing unit 105 to start coding. The signal processing unit 105 reads out moving image data obtained by the image pickup unit 101 and audio data obtained by the audio obtaining unit 102 from the memory 103, and starts coding the moving image data and audio data. The signal processing unit 105 stores coded data in the memory 103.

The recording reproducing unit 108 reads out coded data from the memory 103, and records the coded data in the recording medium 109. When a file is not opened at this time, the recording reproducing unit 108 creates a file where coded data is newly recorded, opens the file, and records the coded data therein as a moving image file.

When receiving an instruction to stop recording from the operation unit 107 after having started recording a moving image this way, the control unit 106 causes the signal processing unit 105 to stop coding the moving image data and audio data, and causes the recording reproducing unit 108 to close the file in which data is being recorded. The control unit 106 also instructs the recording reproducing unit 108 to change the content of file system data and record the file system data in the recording medium 109.

According to this embodiment, in the normal recording mode, moving image data and audio data that are recorded in a time period between the instruction to start recording and the instruction to stop recording is stored in a single moving image file of the MP4 file format.

Next, recording of a still image is described. When the normal recording mode is set once, as described above, the control unit 106 sets the recording apparatus 100 in the recording standby state. If an instruction to start recording a still image is output from the operation unit 107 in this state, the control unit 106 instructs the image pickup unit 101 to pick up one frame of still image in response to the still-image recording instruction. In response to the instruction from the control unit 106, the image pickup unit 101 picks up one frame of still image, and outputs still image data to the memory 103. In response to the instruction from the control unit 106, the signal processing unit 105 reads out still image data from the memory 103, codes the still image data, and sends the data to the recording reproducing unit 108. The recording reproducing unit 108 records the still image data sent from the signal processing unit 105 in the recording medium 109.

Next, the operation of the recording apparatus 100 according to this embodiment to combine moving image files is described. The recording apparatus 100 has a function of combining two moving image files selected from multiple moving image files recorded in the recording medium 109. In the combining operation, moving image data and audio data stored in two moving image files selected by the user are combined in the coded state. Then, a moving image file in which the combined moving image data and audio data is stored is newly generated, and is recorded in the recording medium 109.

Figure 4:
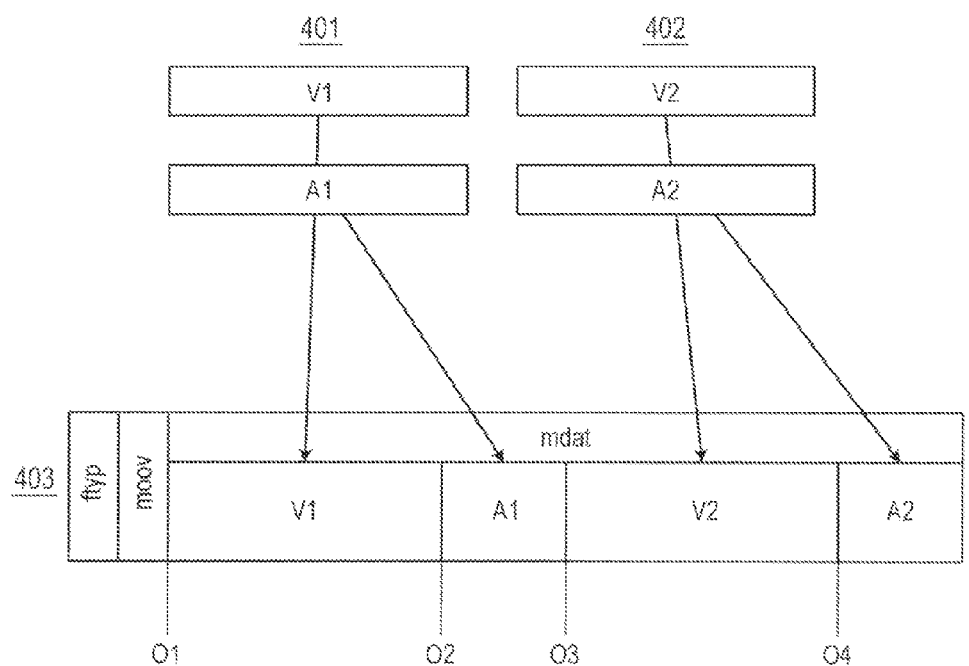
FIG. 4 is a diagram illustrating the structures of combined moving image data and audio data.

FIG. 4 illustrates a moving image file which is newly generated by combining moving image data and audio data in two moving image files. Referring to FIG. 4, moving image data V1 and audio data A1 in an original moving image file 401 and moving image data V2 and audio data A2 in a moving image file 402 are combined to generate a new moving image file 403. Offsets O1 to O4 of chunks of the heads of moving image data and audio data in the moving image file 403 are calculated, and are stored in the moov. FIG. 5A illustrates offset information on the moving image data and audio data in the combination-subjected moving image file 403.

Figure 6:
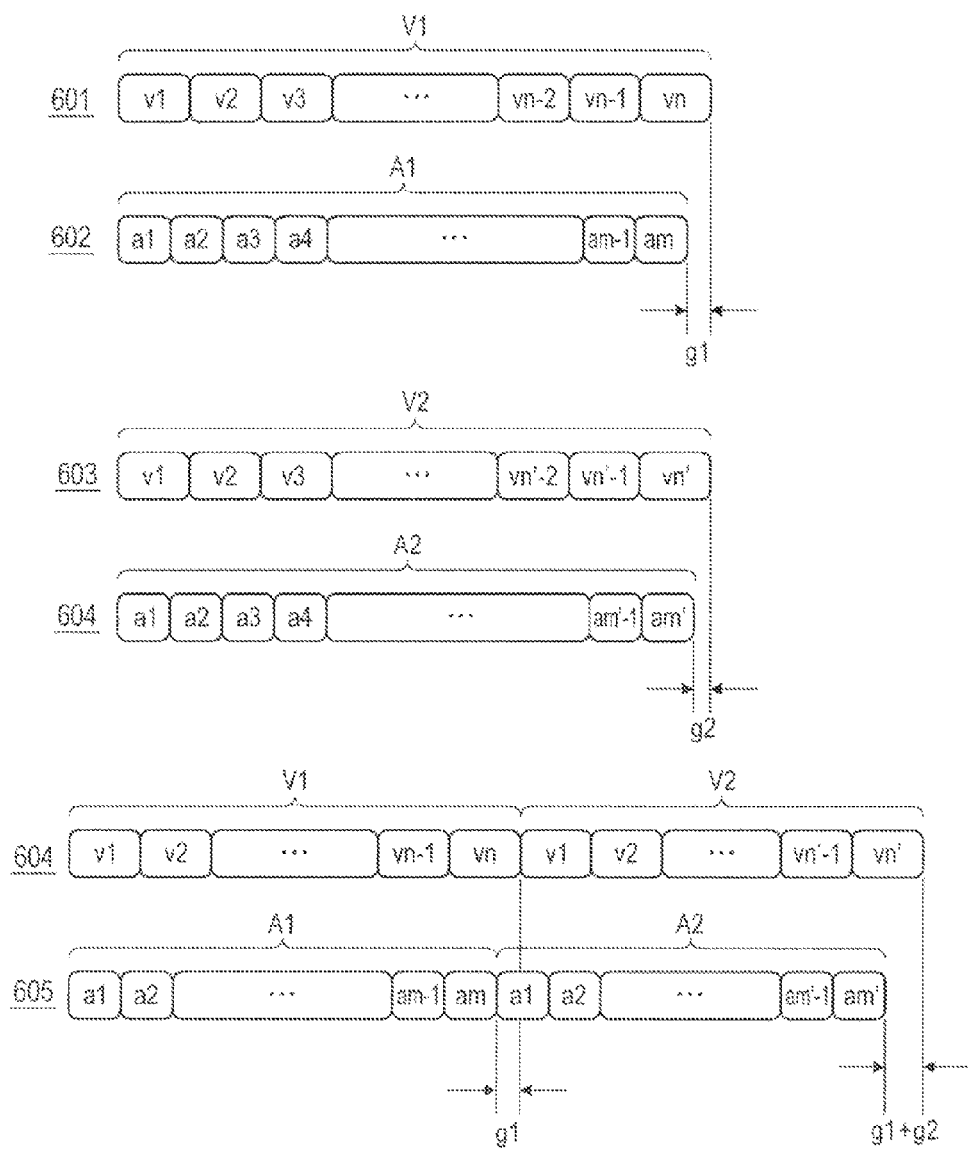
FIG. 6 is a diagram illustrating a temporal difference between reproduction times of combined moving image data and audio data.

FIG. 6 is a diagram illustrating reproduction timings for moving image data and audio data when two moving image files are combined. Referring to FIG. 6, the moving image data V1 and the moving image data V2 in the respective moving image files are denoted by "601" and "603", respectively, and the audio data A1 and the audio data A2 in the respective moving image files are denoted by "602" and "604", respectively. In FIG. 6, a time passage direction is set to be the horizontal direction, and a difference between different points in data corresponds to a temporal difference at the time of reproduction.

Further, v1 to vn and v1 to vn' respectively indicate units of coding for individual moving image data. According to this embodiment, in the simultaneous recording mode, moving image data is coded in accordance with a unit of coding which is moving image samples in one frame of the moving image data to thereby code each frame by intra-frame coding. When the frame rate of moving image data (the number of frames per unit time, which is one second in this example) is set to 29.97 frames/sec, the unit of coding corresponds to 33.3 milliseconds.

Further, a1 to am and a1 to am' respectively indicate units of coding of individual audio data. According to this embodiment, audio data of 1,024 audio samples is coded as a unit of coding. If the sampling frequency of audio data is set to 48 kHz, the unit of coding for a single piece of audio data corresponds to 21.3 milliseconds. One unit of coding for audio data is hereinafter referred to as "audio access unit (AAU)".

Audio data is recorded in accordance with a recording time for moving image data. However; because the length of the unit of coding for moving image data differs from that for audio data as described above, the recording time for audio data hardly becomes the same as the recording time for moving image data. Accordingly, the number of units of coding for audio data to be recorded once is determined in such a way that, for example, the reproduction time for audio data does not exceed the reproduction time for moving image data.

According to this embodiment, one unit of coding of moving image data and one unit of coding of audio data are respectively set to one chunk of a moving image in a moving image file and one chunk of an audio sound therein.

Because the time lengths corresponding to the units of coding for moving image data and audio data differ from each other as described above, there is a temporal difference between end portions of a moving image and an audio sound at the end portion of each scene. Further, the temporal difference at the end portion varies depending on the lengths of a moving image and an audio sound which are to be recorded, and thus varies from one moving image file to another. For example, the temporal difference at the end portions of the moving image data 601 and the audio data 602 is g1, and the temporal difference at the end portions of the moving image data 603 and the audio data 604 is g2.

If moving image data V1 and audio data A1 in one of two moving image files that have such a temporal difference are consecutively combined with moving image data V2 and audio data A2 in another moving image file, therefore, the combination-subjected moving image file data becomes moving image data 604, and the combination-subjected audio data becomes audio data 605.

To reproduce such a combined moving image file of the MP4 file format, the moving image data 604 and the audio data 605 are reproduced continuously from the respective heads. Therefore, the unit of coding a1 at the head of the audio data A2 is reproduced earlier than the head frame v1 of the moving image data V2 by g1. This causes unnatural reproduction such that sounds are heard before the mouth of a person moves. Further, reproduction of the last audio data am' in the audio data A2 ends earlier than the last moving image data vn' in the moving image data V2 by g1+g2.

According to this embodiment, therefore, an original moving image data is recorded in such a way that audio sounds is recorded so that the recording start timing of audio sounds precedes the recording start timing of moving images to prevent an audio sound from being reproduced before a moving image at a portion subsequent to a combined position when moving image files are combined.

Figure 7:
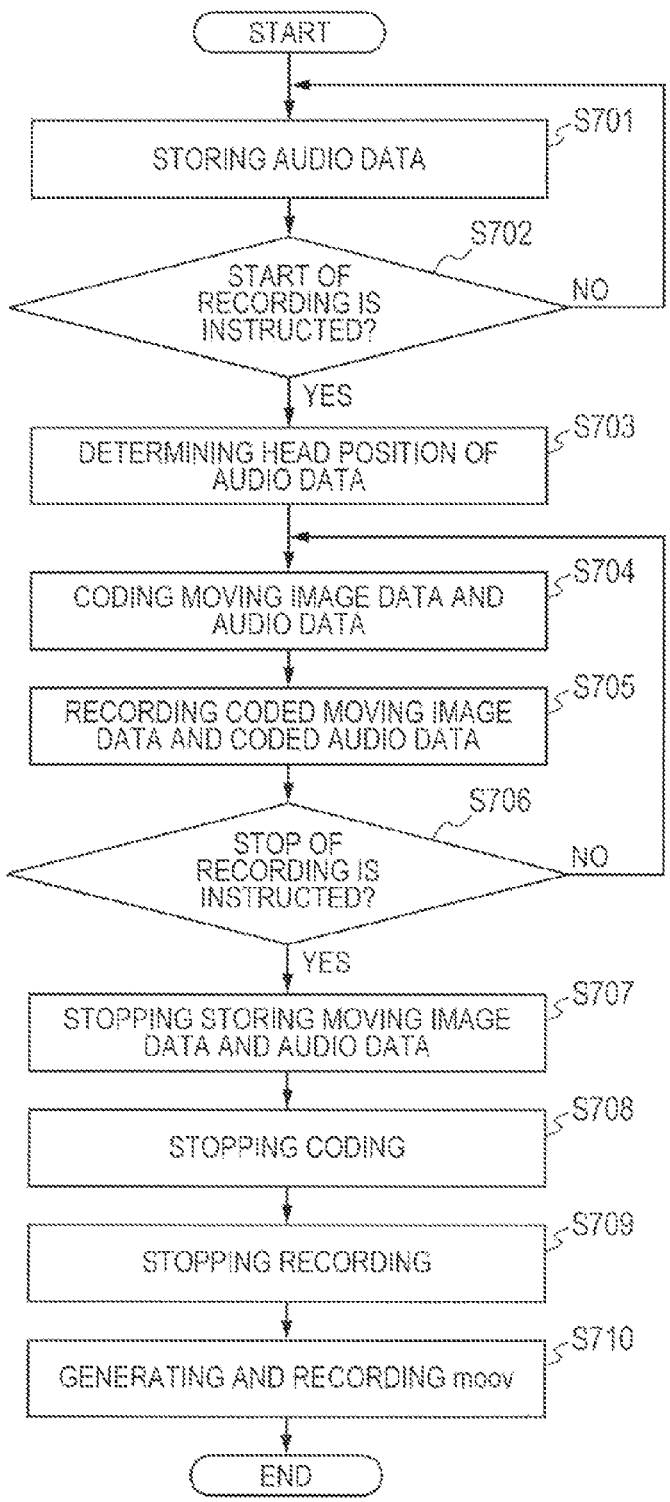
FIG. 7 is a flowchart illustrating the operation of the recording apparatus according to the embodiment of the present invention in a recording mode.

FIG. 7 is a flowchart illustrating the operation of the recording apparatus 100 according to this embodiment in the recording mode. The operation illustrated in FIG. 7 is executed by the control unit 106 controlling the individual units of the recording apparatus 100. As described above, when the recording apparatus 100 is powered on to enter the recording standby state, the processing in FIG. 7 starts.

The control unit 106 starts storing audio data from the audio obtaining unit 102 into the memory 103 (S701). At this time, the control unit 106 stores the audio data in the memory 103 in the form of the audio data output from the audio obtaining unit 102 without being coded.

When the audio data is consecutively stored in the memory 103 in this way so that audio data of at least a predetermined time is stored therein, oldest data is deleted (overwritten). Specifically, the control unit 106 stores audio data of a time period longer than a time period (sample number) corresponding to one AAU in the memory 103.

While repeatedly storing audio data in the memory 103 in this way, the control unit 106 waits for an instruction to start recording from the operation unit 107 (S702). If the recording start instruction is output, the control unit 106 determines the recording head position of audio data stored in the memory 103 (S703). Specifically, the control unit 106 determines, as a head position, a position of audio data stored in the memory 103 which precedes a point of time at which the recording start instruction is output by 1,024 samples. Then, the control unit 106 instructs the signal processing unit 105 to start coding moving image data and start coding the audio data stored in the memory 103 from the determined head position. The signal processing unit 105 starts coding the moving image data sent from the image pickup unit 101, and starts coding the audio data from the determined coding start position (S704). Then, the recording reproducing unit 108 records the coded moving image data and audio data on the recording medium 109 (S705).

If an instruction to stop recording is output after such recording is started (S706), the control unit 106 stops storing the moving image data and audio data in the memory 103 (S707), and stops coding (S708). Because the unit of coding for audio sounds differs from the unit of coding for moving images, the control unit 106 instructs the signal processing unit 105 to stop coding without causing the reproduction time of audio sounds to exceed the reproduction time of moving images. Then, the control unit 106 instructs the recording reproducing unit 108 to stop recording, and the recording reproducing unit 108 thus stops recording the moving image data and audio data (S709). Further, the control unit 106 generates moov, and causes the recording reproducing unit 108 to record the moov in the recording medium 109 (S710).

At this time, the control unit 106 stores not the head AAU (hereinafter referred to as "added audio sound") but offset information of a second AAU, as offset information of the head chunk of audio data. The control unit 106 also stores information on a position of offset from the head of the file of the added audio sound in the moov of a moving image file as additional information.

Recording the offset position of the second AAU as the offset (recording start position) of the head chunk of an audio track in this way prevents an added audio sound of a corresponding audio sound from being reproduced when a moving image file is reproduced, and hence the reproduction timing of a moving image file coincides with the reproduction timing of an audio sound on the unit of coding basis.

Figure 8A:
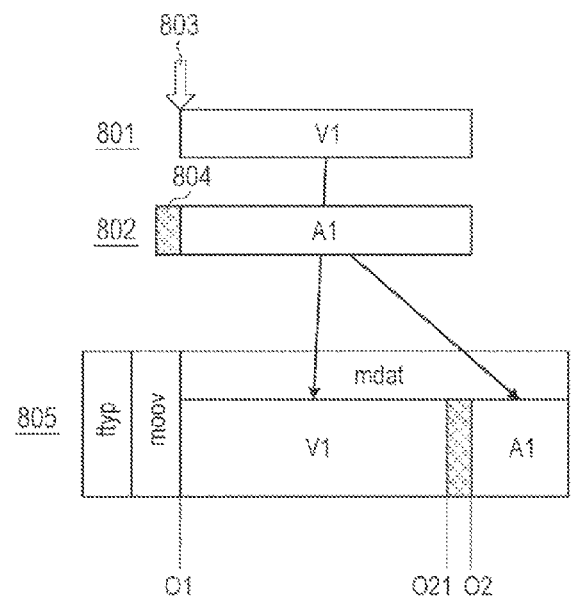
FIGS. 8A and 8B are diagrams illustrating the structure of a moving image file of moving image data and audio data that is combined with a recorded moving image file according to the embodiment of the present invention.

FIG. 8A illustrates moving image data and audio data recorded in such a manner. Referring to FIG. 8A, moving image data V1 and audio data A1 recorded in one time are denoted by "801" and "802", respectively. An added audio sound 804 preceding a time 803 at which the instruction to start recording is output, by a predetermined time is recorded.

In a moving image file 805, the offset O1 of the head chunk of moving image data and the offset O2 of the head chunk of audio data are stored in the moov. An offset O21 of the added audio sound is also stored in the moov. When the moving image file 805 is reproduced, the audio data is reproduced from data at O2 which is the offset position of the head chunk. FIG. 5B illustrates offset information of the head chunks of moving image data and audio data in the moving image file 805.

Next, an operation of combining different moving image files having an added audio sound recorded therein this way is described. The recording apparatus 100 according to this embodiment can give an instruction to combine moving image files by the user operating the operation unit 107 in the reproduction mode.

Figure 9:
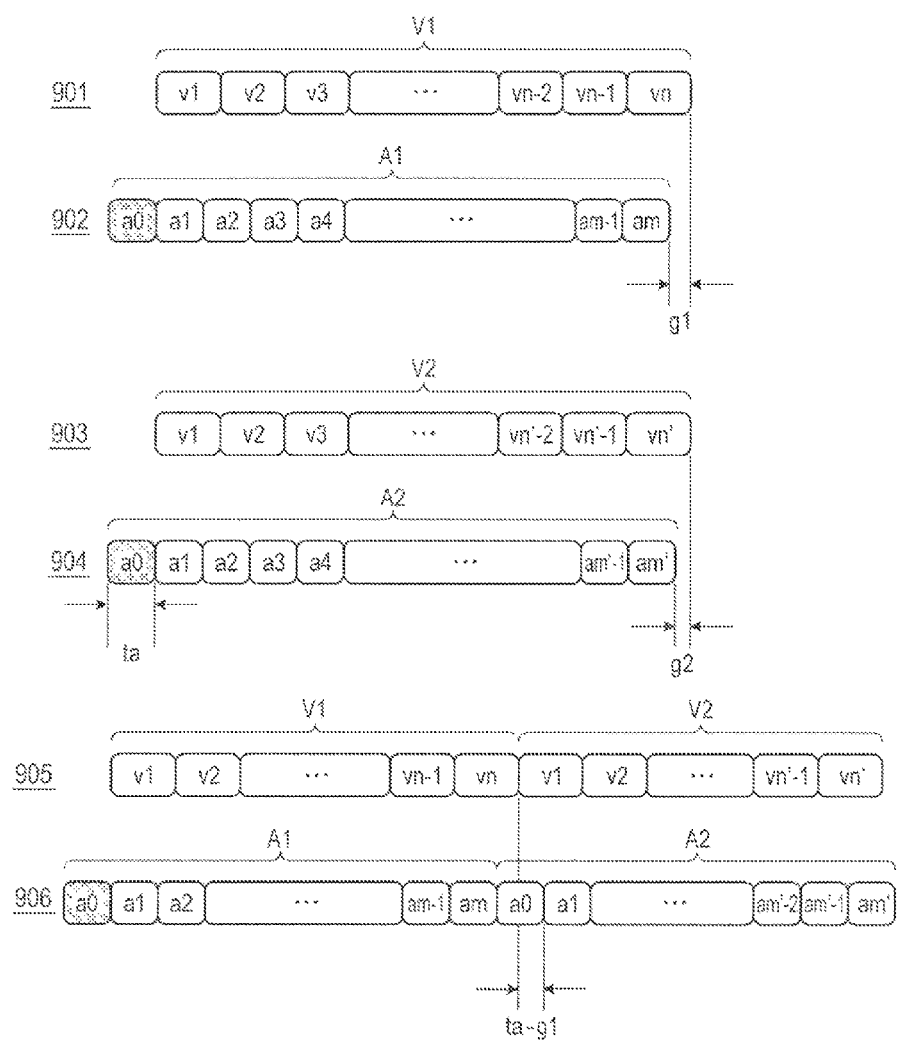
FIG. 9 is a diagram illustrating a temporal difference between reproduction times of combined moving image data and audio data according to the embodiment of the present invention.

FIG. 9 illustrates moving image data and audio data at the time of combining the moving image files. Referring to FIG. 9, moving image data and audio data in two moving image files are denoted by 901 to 904, like 601 to 604 in FIG. 6, respectively. Note that, a head AAUa0 is recorded as an added audio sound in the audio data 902 and audio data 904. A reproduction time of an added audio sound a0 is ta. In FIG. 9, a time passage direction is set to be the horizontal direction, and a difference between different points in data corresponds to a temporal difference at the time of reproduction.

Then, a moving image V2 and an audio sound A2 are combined with a moving image V1 and an audio sound A1, so that a moving image 905 and an audio sound 906 are generated. At this time, an added audio sound a0 of the audio sound A2 is reproduced following a last audio sound am of the audio sound A1 by storing the offset position of a head AAUa0 of the audio sound A2 in the combination-subjected audio track. This permits an audio sound a1 corresponding to a head moving image v1 of the moving image V2 to be reproduced later than the moving image v1 by ta−g1, thus preventing the audio sound from being reproduced before the corresponding moving image.

As a result, the last audio sound am' of the audio sound A2 is reproduced later than the last moving image vn' of the moving image V2, and hence, for example, the offset of the audio sound am' is deleted from the audio track in the combination-subjected moving image file, and is stored in the moov in the combination-subjected moving image file as additional information. Note that, even if reproduction of an added audio sound is set valid, the offset of the last audio sound is not deleted from the audio track if the reproduction end time for an audio sound precedes the reproduction end time for a moving image.

Figure 10:
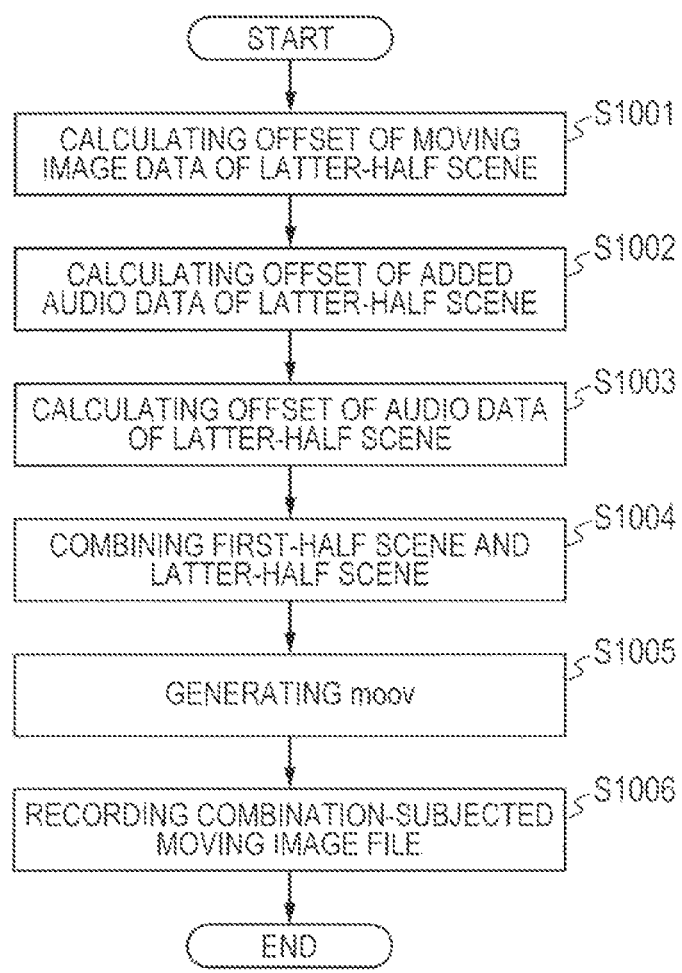
FIG. 10 is a flowchart illustrating an operation of combining moving image data and audio data according to the embodiment of the present invention.

FIG. 10 is a flowchart illustrating the combining operation of the recording apparatus 100 according to this embodiment. The operation of FIG. 10 is executed by the control unit 106 controlling the individual units.

When the user selects two moving image files from multiple moving image files recorded in the recording medium 109, and gives an instruction to combine the two moving image files, the processing in FIG. 10 starts. The user specifies a moving image file that is to be reproduced earlier than the other one in the two moving image files. The moving image file that is reproduced earlier is referred to as "first half scene", and the moving image file that is reproduced later is referred to as "latter half scene".

The control unit 106 calculates each chunk offset of moving image data of the latter half scene in the combination-subjected moving image file based on the offset information of a video track which is stored in the moov of the latter half scene (S1001). Subsequently, the control unit 106 calculates the offset of added audio sound data in the combination-subjected moving image file based on additional information stored in the moov of the latter half scene (S1002). The control unit 106 also calculates each chunk offset of audio data of the latter half scene in the combination-subjected moving image file based on the offset information of an audio track which is stored in the moov of the latter half scene (S1003).

Then, the control unit 106 instructs the recording reproducing unit 108 to combine the first half scene with the latter half scene (S1004). Specifically, the recording reproducing unit 108 copies moving image data and audio data of the first half scene, and moving image data and audio data of the latter half scene into separate recording areas of the recording medium 109, respectively.

Next, the control unit 106 generates a moov of the combination-subjected moving image file containing offset information on the video track and audio track that is calculated in the above-mentioned manner (S1005). At this time, the offset information stored in the moov of the first half scene before the combination is used directly as the offset information of the first half scene. Then, the control unit 106 causes the recording reproducing unit 108 to record the generated moov, and the combination-subjected moving image file containing the combined moving image data and audio data in the recording medium 109 (S1006).

Figure 8B:
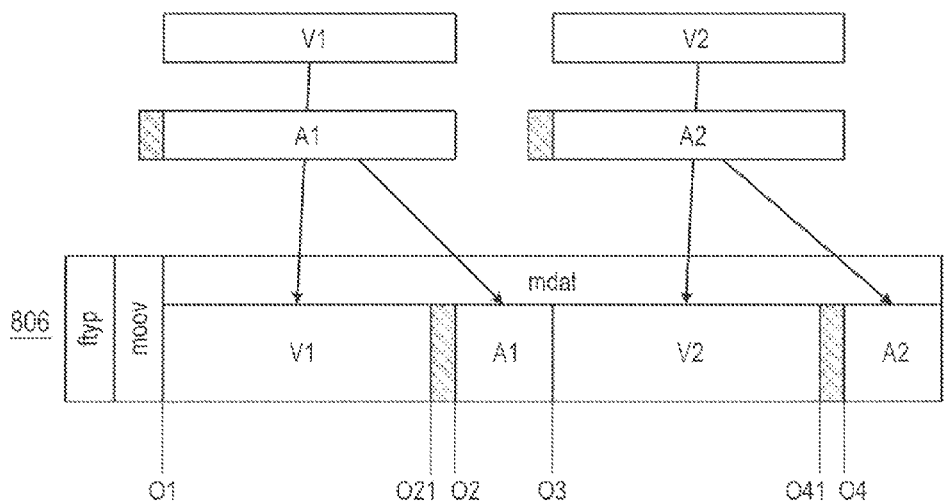

FIG. 8B illustrates the moving image file combined in such a manner. Referring to FIG. 8B, the combination-subjected moving image file is denoted by "806", and pieces of offset information of the head chunks of a moving image and an audio sound of the first half scene are denoted by "O1" and "O2", respectively. An offset of the added audio sound of the first half scene is denoted by "O21". Pieces of offset information of the head chunks of a moving image and an audio sound of the latter half scene in the combination-subjected moving image file are denoted by "O3" and "O4", respectively. The offset of an added audio sound of the latter half scene in the combination-subjected moving image file is denoted by "O41".

As described above referring to FIG. 9, the offset O41 of the added audio sound is stored in the audio track of the combination-subjected moving image file in such a way that the added audio sound of the latter half scene is reproduced. FIG. 5C illustrates the offset information of the combination-subjected moving image file.

According to this embodiment, as described above, audio sounds are recorded earlier than the point of the recording start instruction by a predetermined time at the time of recording moving images and audio sounds. The offset is recorded in such a way that the head audio data is not reproduced in the normal recording mode, and at the time of combining two moving image files, an added audio sound is reproduced in accordance with the temporal difference between a moving image and an audio sound at the end portion of the moving image file to which the other moving image file is combined.

Accordingly, an audio sound is not reproduced before moving images after the combined portion, thus preventing unnatural reproduction. Because data of silence is not inserted at the combined portion, an audio sound does not have a break during reproduction of a partial combination-subjected moving image file.

Next, the simultaneous recording mode is described. The recording apparatus 100 is configured to have the simultaneous recording mode for recording moving images for n seconds (n being a predetermined value) directly before an instruction to record a still image and audio sounds corresponding to the moving images for n seconds, together with the still image, when an instruction to record the still image is given. The moving image data and audio data that are recorded in the simultaneous recording mode are additionally written and recorded in a single moving image file. It is assumed that in the simultaneous recording mode, each frame of moving image data is coded by intra-frame prediction coding to be recorded.

If the operation unit 107 outputs an instruction for the simultaneous recording mode, the control unit 106 sets the recording apparatus 100 to the simultaneous recording mode and in the recording standby state. In the recording standby state in the simultaneous recording mode, the control unit 106 repeatedly stores moving image data for n seconds output from the image pickup unit 101, and audio data corresponding to n seconds and obtained by the audio obtaining unit 102 in the memory 103 as described later. At this time, as described later, the moving image data for n seconds is coded by the signal processing unit 105 with being stored in the memory 103. Further, the audio data corresponding to the moving images for n seconds is also coded by the signal processing unit 105 with being stored in the memory 103.

If the simultaneous recording mode is set, the control unit 106 controls the recording reproducing unit 108 to detect a moving image file recorded in the simultaneous recording mode from the recording medium 109. If a moving image file recorded in the simultaneous recording mode is present in the recording medium 109, the control unit 106 detects information on the file name of this moving image file, and stores the information in the memory 103.

If the instruction to record the still image is output in the recording standby state in the simultaneous recording mode, the control unit 106 stops storing coded moving image data and audio data in the memory 103. In addition, the control unit 106 instructs photographing of one screen of still image in response to the still-image recording instruction, and causes the recording reproducing unit 108 to record coded still image data in the recording medium 109 as in the above-mentioned still-image recording mode.

The control unit 106 instructs the recording reproducing unit 108 to record moving image data and audio data for n seconds stored in the memory 103. At this time, if a moving image file recorded in the simultaneous recording mode is already present in the recording medium 109, the control unit 106 instructs to additionally write and record moving image data and audio data currently recorded in this moving image file. If a moving image file recorded in the simultaneous recording mode is not present in the recording medium 109, on the other hand, the control unit 106 instructs to create a new moving image file, and record moving image data and audio data therein. In creating a new moving image file, the control unit 106 adds additional information for identifying that this moving image file is recorded in the simultaneous recording mode, to the moving image file to be recorded.

FIG. 11 is a diagram illustrating moving image data and audio data that are recorded in the simultaneous recording mode, and a moving image file in which the individual pieces of data are stored. Referring to FIG. 11, still-image recording instructions are output at each of times 1101, 1102, and 1103, and moving images and audio sounds, V1 and A1, V2 and A2, and V3 and A3 respectively immediately preceding those times are recorded at the respective times. Those moving images and audio data are additionally written and recorded in a single moving image file 1104. Further, the offsets of the head chunks of the individual pieces of moving image data and audio data are stored in the moov as illustrated in FIG. 12. As illustrated in FIG. 12, the offsets O1, O3, and O5 of the head chunks of the individual pieces of moving image data are stored in the stco of a video track, and the offsets O2, O4, and O6 of the head chunks of the individual pieces of audio data are stored in the stco of an audio track.

Figure 13:
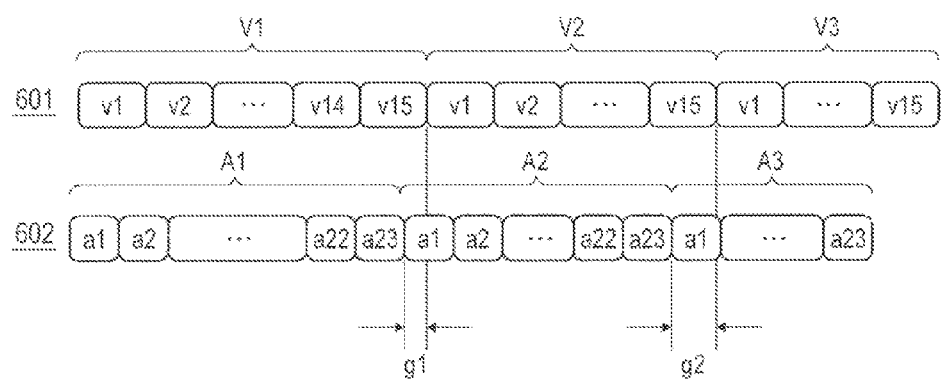
FIG. 13 is a diagram illustrating reproduction times of the moving image data and audio data additionally written in the moving image file.

FIG. 13 illustrates the appearance of moving image data and audio data in three scenes recorded in the simultaneous recording mode. Referring to FIG. 13, V1 to V3 each indicate one scene of moving image data for n seconds from the point of the recording start instruction, and A1 to A3 each indicate one scene of audio data. In FIG. 13, the time passage direction is set to be the horizontal direction, and a difference between different points in data corresponds to a temporal difference at the time of reproduction.

In FIG. 13, as in FIG. 6, v1 to v15 indicate the units of coding of moving image data, and a1 to a23 (a24) indicate the units of coding of audio data. In FIG. 13, for simplifying the description, the time of moving image data to be recorded in single simultaneous recording is set to a period corresponding to 15 frames. Although audio data is recorded in accordance with the recording time of moving image data, the recording time of audio data hardly becomes the same as the recording time of moving image data because the length of the unit of coding of moving image data differs from that of audio data as described above. Further, in the simultaneous recording mode, each of moving image data and audio data is sequentially coded to be stored in the memory 103 repeatedly. According to this embodiment, therefore, if there is an instruction to photograph a still image, with the frame of a moving image corresponding to this still-image photographing instruction being treated as the last frame, moving images of a predetermined period immediately preceding the last frame, i.e., 15 frames of moving images, are recorded. Further, the last AAU of audio data is determined in such a way that the reproduction time of audio data does not follow the last frame of the moving image data. Then, an AAU including such a sample in the audio data stored in the memory 103 that corresponds to the head frame of moving images of the predetermined period (15 frames) to be recorded is determined as the head AAU to be recorded. Coded audio data from the head AAU to the last AAU is audio data to be recorded at a time. In FIG. 13, for example, a23 becomes the last AAU so as not to exceed the reproduction time for V15 which is the last frame. Then, a1 including samples corresponding to V1 becomes the head AAU of audio data to be recorded. Pieces of audio data from a1 to a23 are recorded.

Because the time length corresponding to the unit of coding of moving image data differs from the time length corresponding to the unit of coding of audio data as described above, there is a temporal difference between end portions of a moving image and an audio sound at the end portion of each scene. In FIG. 13, for example, the temporal difference at the end portions of the moving image V1 and the audio sound A1 is g1. In the simultaneous recording mode, moving image data and audio data are additionally written and recorded into a single moving image file. Accordingly, a moving image V2 and an audio sound A2 of a next scene are written additionally to the moving image V1 and the audio sound A1 that have such a temporal difference.

At the time of reproducing a moving image file of the MP4 file format of FIG. 13 that is recorded in the above-mentioned manner, the moving image data and the audio data are reproduced continuously from the respective heads thereof. Therefore, the unit of coding a1 at the head of the audio data A2 is reproduced earlier than preceding the head frame v1 of the moving image data V2 by g1.

According to this embodiment, therefore, an added audio sound is recorded at the head of audio data even in the simultaneous recording mode. Whether to reproduce the added audio sound is controlled in the simultaneous recording mode based on the temporal difference between a moving image and an audio sound at the end portion when moving image data and audio data are reproduced from the head of the moving image file to which another moving image file is additionally written, thereby preventing unnatural reproduction. Specifically, if the temporal difference between a moving image and an audio sound at the end portion when moving image data and audio data are reproduced from the head of the moving image file to which another moving image file is additionally written exceeds the reproduction time for one AAU, the added audio sound is reproduced. Otherwise, the added audio sound is not reproduced. This prevents the reproduction timing of an audio sound from considerably preceding the reproduction timing of a moving image.

Further, the editing process of partially deleting moving image data recorded in the simultaneous recording mode in the units of n seconds is performed so that the added audio sound is reproduced when the post-edited moving image file is reproduced, thereby preventing reproduction of an audio sound from preceding reproduction of a corresponding moving image.

FIG. 14 is a flowchart illustrating the operation of the recording apparatus 100 according to this embodiment in the simultaneous recording mode. The operation illustrated in FIG. 14 is executed by the control unit 106 controlling the individual units of the recording apparatus 100. As described above, when the simultaneous recording mode is set in the recording standby state, the processing in FIG. 14 starts.

The control unit 106 instructs the signal processing unit 105 to start coding moving image data from the image pickup unit 101 and audio data from the audio obtaining unit 102 (S1401). The signal processing unit 105 sequentially reads out moving image data from the memory 103, codes the moving image data, and stores the coded moving image data in the memory 103 again (S1402).

In a case where the coded moving image data and audio data are consecutively stored in the memory 103 so that moving image data of n seconds is stored therein, oldest data is deleted (overwritten). Audio data larger in amount than n seconds by a predetermined time is stored in the memory 103. Specifically, audio data preceding the current audio data by two AAUs which are earlier than the current point by n seconds is stored in the memory 103.

While repeatedly storing the coded moving image data and audio data in the memory 103 in the above-mentioned manner, the control unit 106 waits for an instruction to photograph a still image from the operation unit 107 (S1403). In a case where the still-image photographing instruction is output, the control unit 106 generates one frame of still image data, and records the still image data in the recording medium 109 as described above (S1404).

Then, the control unit 106 stops coding the moving image data and audio data, and stops storing newly coded moving image data and audio data in the memory 103 (S1405). Next, the control unit 106 determines the head frame and last frame to be recorded from among the moving image data stored in the memory 103 in the above-mentioned manner. The control unit 106 also determines the head AAU and last AAU of audio data to be recorded in the above-mentioned manner (S1406).

The control unit 106 instructs the recording reproducing unit 108 to additionally write the coded moving image data and audio data to the moving image file that has already been recorded in the recording medium 109 in the simultaneous recording mode. The recording reproducing unit 108 additionally writes and records the moving image data and audio data stored in the memory 103 to the specified moving image file (S1407).

Next, if the moving image file recorded in the simultaneous recording mode has already been recorded in the recording medium 109, the control unit 106 detects the temporal difference between a moving image and an audio sound at the end portions thereof in case of reproducing this moving image file from the head (S1408). The temporal difference at the end portion (reproduction end position) is obtained as follows.

(temporal difference)=(reproduction end position of a video track)−(reproduction end position of an audio track)

(reproduction end position of a video track)=(video reproduction start timing (edts))+(reproduction time of video sample (stsc))×(the number of video samples (stsz))

(reproduction end position of an audio track)=(audio reproduction start timing (edts))+(reproduction time of audio sample (stsc))×(the number of audio samples (stsz))

The temporal difference between a moving image and an audio sound at the end portion in a case where the moving image file is reproduced from the head is obtained this way.

Further, according to this embodiment, every time single recording in the simultaneous recording mode ends, the temporal difference between a moving image and an audio sound at each of the heads and end portions thereof that are recorded in the single recording is detected, and is stored in the moov as additional information. Moving images and audio sounds that are recorded in single recording are hereinafter referred to as "one scene". According to this embodiment, information on the temporal difference at each of the head and the end portion is stored in the moov for each scene. At this time, not the temporal distances between the head of the added audio sound and the head of the moving image but the temporal difference between the next AAU of the added audio sound and the head of the moving image is recorded as the temporal difference at the head portion.

According to this embodiment, a count value of the clocks of a predetermined frequency is recorded as information indicative of the temporal difference. For example, in the MPEG coding, a decoding timing, and the output timings of decoded images and audio sounds are managed based on the count value of a counter for counting the clocks of a determined frequency. Accordingly, the count value of the clocks of the predetermined frequency for decoding is recorded as information on the temporal difference. Note that, other forms of information may be available as long as the information represents the temporal difference between a moving image and an audio sound.

If a moving image file recorded in the simultaneous recording mode is not present in the recording medium 109, the control unit 106 performs the process considering that there is no temporal difference.

Next, the control unit 106 instructs the recording reproducing unit 108 to update the contents of the management information moov of the additionally written moving image file (S1409). At this time, the control unit 106 determines whether the temporal difference between a moving image and an audio sound at the end portion of the moving image file to which another moving image file is additionally written is longer than the reproduction time of one AAU. If the temporal difference at the end portion is equal to or less than the reproduction time of one AAU, the control unit 106 does not store offset information of the head AAU of audio data to be additionally recorded, in the audio track, but stores offset information of the second AAU on the audio track. Then, the control unit 106 stores offset information of the head AAU (added audio sound) in the moov as additional information.

If the temporal difference at the end portion is greater than the reproduction time of one AAU, on the other hand, the control unit 106 stores offset information of the head AAU of audio data to be additionally recorded, in the audio track. In this manner, information on newly recorded moving image data and audio data is added to the moov. Further, for the currently recorded scene, the control unit 106 stores information on the temporal difference between a moving image and an audio sound at each of the head portion and the end portion in the moov as additional information.

Thereafter, in a case where the simultaneous recording mode is still set, the control unit 106 returns to S1401 again when update of the moov in S1409 ends, and starts storing moving image data and audio data in the memory 103.

FIG. 15 is a diagram illustrating moving image data and audio data to be recorded in the simultaneous recording mode. In FIG. 15, v1 to v15 indicate the units of coding for coded moving image data, and a0 to a23 indicate the units of coding of audio data. According to this embodiment, as described above, each frame of moving image data is coded by intra-frame prediction coding in the simultaneous recording mode. Therefore, the individual units of coding v1 to v15 each correspond to one frame. In FIG. 15, the time passage direction is set to be the horizontal direction, and a difference between different points in data corresponds to a temporal difference at the time of reproduction.

If there is an instruction to record a still image at time 1501 as illustrated in FIG. 15, the last position (frame), v15, and the head position (frame), v1, of the moving image data are determined. Then, the last position, a23, of audio data is determined in such a way that the reproduction time does not come later than the last position. Further, a0 preceding a1 which is an AAU containing samples corresponding to a head position 1502 of the moving image data by one is determined as the unit of coding of the head of the audio data.

The head AAUa0 is recorded as an added audio sound. Then, if the temporal difference between a moving image and an audio sound at the end portion thereof in reproducing, from the head, the moving image file to which another moving image file is additionally written is equal to or less than the reproduction time for one AAU, offset information of a1 is stored on the audio track as the chunk offset of the head of the additionally written audio data, and offset information of a0 is stored in the moov as additional information.

If the temporal difference between the moving image and the audio sound at the end portion thereof is greater than the reproduction time for one AAU, on the other hand, the offset of a0 which is the head added audio sound is stored in the moov.

FIG. 16 illustrates moving image data and audio data that are recorded in the simultaneous recording mode, and a moving image file in which the individual pieces of data are stored. FIG. 16 illustrates the moving image file in a case where an added audio sound is recorded as described above. In FIG. 16, the time passage direction is set to be the horizontal direction, and a difference between different points in data corresponds to a temporal difference at the time of reproduction.

Referring to FIG. 16, an instruction to record a still image is output at each of times 1601, 1602, and 1603, and V1 and A1, V2 and A2, and V3 and A3, which are respectively moving images and audio sounds immediately preceding the respective those times, are recorded. Further, added audio sounds 1604, 1605, and 1606 of one AAU are recorded to the audio data of the individual scenes. Those moving image data and audio data are additionally recorded in a single moving image file 1607. At the time each scene is added, if the temporal difference at the end portion of the moving image file to which another moving image file is additionally written is not greater than one AAU, the offsets of the head chunks of each moving image data and audio data in the moving image file 1607 are stored in the moov as illustrated in FIG. 12. As illustrated in FIG. 12, O1, O3, and O5 which are the offsets of the head chunks of the individual pieces of moving image data are stored in the stco of the video track, and O2, O4, and O6 which are the offsets of the head chunks of the individual pieces of audio data are stored in the stco of the audio track. Further, pieces of offset information O21, O41, and O61 of the added audio sounds are stored in the moov as additional information.

Accordingly, in a case where the moving image file 1607 recorded in the simultaneous recording mode is reproduced, the added audio sounds 1604, 1605, and 1606 are not reproduced.

Next, a process of partly deleting a moving image file recorded in the simultaneous recording mode is described. The recording apparatus 100 has a partial deletion function of partially deleting a moving image file recorded in the simultaneous recording mode, and recording the data remaining after the deletion as a single file with n seconds being treated as a unit. In the partial deletion, moving image data and audio data preceding and following the deleted portion are combined in a coded form. Whether to effectively reproduce added audio sounds of the individual scenes is controlled based on the difference in reproduction time between the moving image data and audio data preceding and following the deleted portion, thereby adjusting the reproduction timing so that the moving images and audio sounds at and following the deleted portion is not reproduced unnaturally.

For example, in a case where the moving image V2 of n seconds and the corresponding audio sound A2 are deleted from the moving image file 1607, the moving images V1 and V3 preceding and following the deleted moving image V2 are combined, and the audio sounds A1 and A3 preceding and following the deleted audio sound A2 are combined.

Figure 17A:
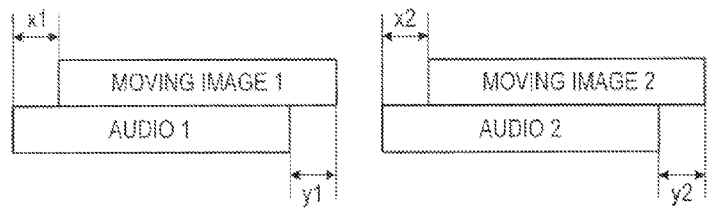
FIGS. 17A, 17B, 17C, 17D, 17E and 17F are diagrams illustrating combination patterns in a partially deleting operation according to the embodiment of the present invention.

FIGS. 17A to 17F are diagrams illustrating moving image data and audio data preceding and following the deleted portion in the partial deletion process, and their combination patterns. In FIG. 17A, a moving image 1 and an added audio sound 1 are moving image data and audio data immediately preceding the deleted portion, and a moving image 2 and an added audio sound 2 are moving image data and audio data immediately following the deleted portion. Further, x1 indicates a temporal difference between the head portions of the moving image 1 and the audio sound 1, y1 indicates a temporal difference between the trailing end portions of the moving image 1 and the audio sound 1, x2 indicates a temporal difference between the head portions of the moving image 2 and the audio sound 2, and y2 indicates a temporal difference between the trailing end portions of the moving image 2 and the audio sound 2.

Then, at the time of combining moving images and audio sounds preceding and following the deleted portion after the partial deletion, the reproduction timing of audio data in the combination-subjected moving image file is controlled based on those temporal differences.

Figure 17B:
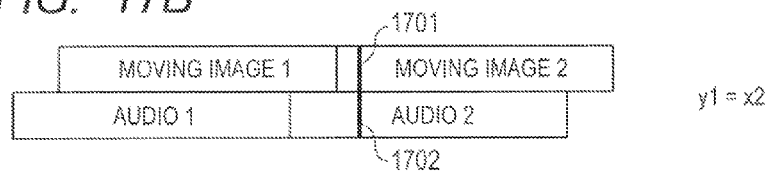

First, if y1=x2, the moving images and audio sounds preceding and following the deleted portion are combined as they are as illustrated in FIG. 17B. In this case, the chunk offsets of the moving image and audio sound following the deleted portion are obtained by deleting the size of the deleted portion from the offset before the deletion. In FIG. 17B, reproduction positions 1701 and 1702 indicate the corresponding reproduction positions of the moving image 2 and the audio sound 2. If y1=x2, the reproduction timings of the reproduction positions 1701 and 1702 become the same.

Figure 17C:

Next, if "y1>x2, and (y1−x2)+y2≥(time of 1 AAU)", as illustrated in FIG. 17C, reproduction of the unit of coding a0 which is the added audio sound of the audio sound 2 is set valid. That is, in this case, y1 is greater than x2, and hence if the moving images 1 and 2, and the audio sounds 1 and 2 are combined as they are, the reproduction timing of the audio sound 2 becomes earlier than that of the moving image 2. In this respect, reproduction of the head AAUa0 which is the added audio sound of the audio sound 2 is set valid. Specifically, the offset of a0 is calculated, and is stored in the audio track. This delays the reproduction timing of the audio sound 2 by a0, and hence reproduction does not become unnatural.

If "(y1−x2)+y2≤(time of 1 AAU)", in which case the reproduction timing of the audio sound 2 is delayed by the time of the added audio sound, the audio data is reproduced until the last unit of coding of the audio sound 2 because the reproduction end time of the moving image 2 comes later than the reproduction end time of the audio sound 2.

Figure 17D:
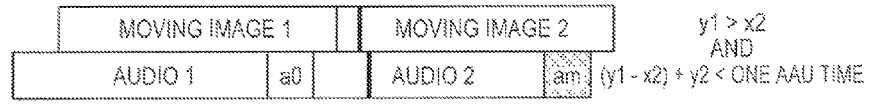

Next, if "y1>x2, and (y1−x2)+y2≤(time of 1 AAU)", as illustrated in FIG. 17D, reproduction of the unit of coding a0 which is the added audio sound of the audio sound 2 is set valid. In this case, likewise, y1 is greater than x2, and hence reproduction of the head unit of coding a0 which is the added audio sound of the audio sound 2 is set valid.

If "(y1−x2)+y2<(time of 1 AAU)", the reproduction timing of the audio sound 2 is delayed by the time of the added audio sound, and hence the reproduction end time of the audio sound 2 becomes later than the reproduction end time of the moving image 2. Accordingly, the offset of the last unit of coding am of the audio sound 2 is deleted from the moov so as not to reproduce the last unit of coding am. Then, the offset of the last unit of coding am, and information on the temporal difference between the end portion of the moving image 2 and the end portion of the audio sound 2 in a case where reproduction of am is inhibited are stored in the moov as additional information.

Figure 17E:

Next, if "y1<x2 and (x2−y1)−y2>0", as illustrated in FIG. 17E, reproduction of the unit of coding a0 which is the added audio sound of the audio sound 2 is not set valid, and the moving images 1 and 2, and the audio sounds 1 and 2 are combined as they are. That is, in this case, x2 is greater than y1, and hence combining the moving images 1 and 2, and the audio sounds 1 and 2 makes the reproduction timing of the audio sound 2 delayed compared to the reproduction timing of the moving image 2. It is therefore unnecessary to reproduce the added audio sound.

If "(x2−y1)−y2>0", the reproduction end time of the audio sound 2 becomes later than the reproduction end time of the moving image 2. Accordingly, the offset of the last unit of coding am of the audio sound 2 is deleted from the moov so as not to reproduce the last unit of coding am. Then, the offset of the last unit of coding am, and information on the temporal difference between the end portion of the moving image 2 and the end portion of the audio sound 2 in a case where reproduction of am is inhibited are stored in the moov as additional information.

Figure 17F:
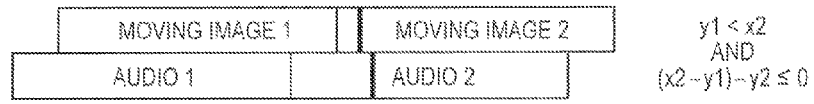

Next, if "y1<x2 and (x2−y1)−y2≤0", as illustrated in FIG. 17F, reproduction of the unit of coding a0 which is the added audio sound of the audio sound 2 is not set valid, and the moving images 1 and 2, and the audio sounds 1 and 2 are combined as they are.

If "(x2−y1)−y2≤0", in which case the reproduction timing of the audio sound 2 comes later than the reproduction timing of the moving image 2, the audio data is reproduced until the last unit of coding of the audio sound 2 because the reproduction end time of the moving image 2 comes later than the reproduction end time of the audio sound 2.

The control unit 106 executes the partial deletion process in the above-mentioned manner, and, for each scene following the deleted portion, then calculates the temporal difference between moving image data and audio data at the end portion in each scene when the moving image file is reproduced from the head thereof in the above-mentioned manner.

In a case where the temporal difference at the end portion exceeds the reproduction time for one AAU, the control unit 106 adds the offset of the head AAU to the moov so as to reproduce the added audio sound which is the head AAU of the next scene.

FIG. 18 illustrates a flowchart for the operation of partially deleting the moving image file recorded in the simultaneous recording mode according to this embodiment. The operation in FIG. 18 is carried out by the control unit 106 controlling the individual units.

In the reproduction mode, the user operates the operation unit 107 to instruct partial deletion of the moving image file recorded in the simultaneous recording mode. When the partial deletion is instructed, the control unit 106 controls the individual units to display reduced images of frames at every n seconds from the head of the specified moving image file on the display unit 104. Specifically, the control unit 106 detects the positions of moving image data at every n seconds from the offset information stored in the moov of the specified moving image file. Then, the control unit 106 instructs the recording reproducing unit 108 and the signal processing unit 105 to reproduce the detected moving image data at every n seconds, and generate reduced images.

The recording reproducing unit 108 reads out the moving image data at the specified positions, and stores the moving image data in the memory 103. The signal processing unit 105 decodes the read moving image data, reduces the individual frames of the decoded moving image data, and displays the reduced images on the display unit 104.

The user selects a reduced image corresponding to a portion to be deleted from among the reduced images at every n seconds displayed on the display unit 104, and instructs deletion of the selected reduced image. At this time, at least one piece of moving image data at every n seconds may be selected as a portion to be deleted. A portion to be deleted is specified this way, then the process in FIG. 18 starts.

The control unit 106 detects temporal differences between moving images and audio sounds preceding and following the deleted portion from the original moving image file as illustrated in FIG. 17A (S1801). As described above, at the time of recording a moving image file in the simultaneous recording mode, information on the temporal differences between moving images and audio sounds at the head portion and the end portion of each of scenes at every n seconds is stored in the moov as additional information. The control unit 106 detects the temporal differences based on the information thereon. Next, the control unit 106 calculates the offsets of moving images and audio sounds following the deleted portion based on the offset information stored in the moov of the original moving image file (S1802).

Next, the control unit 106 determines whether the temporal differences between moving images and audio sounds preceding and following the deleted portion are of y1=x2 as illustrated in FIG. 17B (S1803). If y1=x2, the control unit 106 calculates the temporal difference between the moving image and audio sound at the end portion of each scene following the deleted portion (S1804). If the temporal difference at the end portion exceeds the reproduction time for one AAU, the control unit 106 adds the offset of the head AAU to the moov so that the added audio sound which is the head AAU of the next scene is reproduced (S1805). Next, the control unit 106 stores the offset information calculated and changed in this manner in the moov of the moving image file after the partial deletion (S1806). As a result, moving images and audio sounds preceding and following the deleted portion are combined.

If y1=x2 is not satisfied in S1803, the control unit 106 determines whether y1>x2 is satisfied (S1807). If y1>x2, the control unit 106 calculates the offset of the added audio sound which is the head unit of coding of the audio data immediately following the deleted portion (S1808). Then, the control unit 106 stores the offset of the added audio sound in the moov (S1809).

Further, the control unit 106 determines whether "(y1−x2)+y2≥(time of 1 AAU)" (S1810). If "(y1−x2)+y2≥(time of 1 AAU)", the control unit 106 proceeds to S1804. If "(y1−x2)+y2≥(time of 1 AAU)" is not satisfied, i.e., if "(y1−x2)+y2<(time of 1 AAU)", the control unit 106 deletes the offset of the last unit of coding of the audio data of n seconds immediately following the deleted portion from the offset calculated in S1802 (S1811). In addition, the control unit 106 stores the offset information of the last unit of coding as additional information in the moov (S1812), and then proceeds to S1804.

When y1>x2 is not satisfied in S1807, then, y1<x2, and hence the control unit 106 determines whether (x2−y1)−y2>0 is satisfied (S1813). If (x2−y1)−y2>0, the control unit 106 deletes the offset of the last unit of coding of the audio data of n seconds immediately following the deleted portion from the offset calculated in S1802 (S1811). In addition, the control unit 106 stores the offset information of the last unit of coding as additional information in the moov (S1812), and then proceeds to S1804.

If (x2−y1)−y2>0 is not satisfied, i.e., if (x2−y1)−y2≤0, the control unit 106 proceeds to S1804.

With regard to each of the remaining moving images and audio sounds to be recorded after the partial deletion process, the control unit 106 keeps the temporal differences at the head portion and the end portion every n seconds, and offset information of the added audio sounds stored in the moov.

In this way, in a case where moving image data at every n seconds and corresponding audio data are deleted from the moving image file recorded in the simultaneous recording mode, unnatural reproduction of moving images and audio sounds following the deleted portion can be prevented.

Next, the operation of the recording apparatus 100 at the time of reproduction according to this embodiment is described. In a case where the operation unit 107 outputs an instruction for the reproduction mode, the control unit 106 instructs the recording reproducing unit 108 to read out a thumbnail image of each moving image file recorded in the recording medium 109 and store the thumbnail image in the memory 103. According to this embodiment, the control unit 106 creates reduced image data of the head frame of moving image data of a new moving image file at the time of creating the new moving image file, and stores and records the reduced image data as thumbnail image data in the moving image file.

The signal processing unit 105 generates an index screen of each moving image file using each thumbnail image data stored in the memory 103, and displays the index screen on the display unit 104. The user operates the operation unit 107 to select one of the thumbnail images from the displayed index screen, and instructs reproduction of the selected moving image file.

In a case where the reproduction instruction is output, the control unit 106 instructs the recording reproducing unit 108 to reproduce the selected moving image file. The recording reproducing unit 108 reproduces the specified moving image file, and stores the moving image file in the memory 103. The signal processing unit 105 reads out coded moving image data and audio data from the memory 103, decodes the moving image data and audio data, and stores the decoded moving image data and audio data in the memory 103 again. The decoded moving image data is sent to the display unit 104 to be displayed thereon. The decoded audio data is output from an output unit (not shown) or the like.

According to this embodiment, as described above, in a case where a moving image and an audio sound are additionally recorded in a single moving image file in the simultaneous recording mode, audio sounds are recorded earlier by a predetermined time than the head position of the audio data corresponding to the head of the moving image. If the temporal difference between the moving image and the audio sound at the end portion of a scene is equal to or less than a predetermined time, the offset is recorded in such a way as not to reproduce the audio data at the head thereof and when moving images and audio sounds are combined after partial deletion, an added audio sound is reproduced based on the temporal differences between moving images and audio sounds preceding and following the combined portion. When the temporal difference between the moving image and the audio sound at the end portion exceeds a predetermined time, the audio data is recorded in such a way that the head audio data is reproduced.

Accordingly, an audio sound is not reproduced considerably preceding the reproduction of a moving image in a scene in which the moving image and audio sound are additionally recorded in the simultaneous recording mode. When partial deletion is executed, audio sounds are not reproduced before the reproduction of moving images following the combined portion in scenes preceding and following the deleted portion, thus preventing unnatural reproduction. In addition, data of silence is not inserted at the combined portion, and hence an audio sound does not have a break during reproduction of a partial deletion-subjected moving image file.

Although data is recorded in such a way that the reproduction time for audio data does not exceed the reproduction time for moving image data according to this embodiment, this embodiment may be configured to record up to the unit of coding of audio data corresponding to the end of moving image data.

Although each frame in moving image data is coded by intra-frame prediction coding in the simultaneous recording mode according to this embodiment, each frame in moving image data may be coded using intra-frame coding and inter-frame coding as performed in the normal recording mode.

In this case, moving image data can be decoded in units called "GOP", and hence the recording head and the end position of moving image data are determined by the GOP unit. Therefore, after coding of a moving image and an audio sound is stopped in S1405, the recording head position of the moving image is determined as follows. The control unit 106 detects a GOP including frames preceding the point of the instruction to record a still image by n seconds. Then, the control unit 106 sets the frame at the head of the GOP as the recording start position of moving image data. Further, the control unit 106 may set the GOP including the frame that corresponds to the still-image recording instruction as the recording end position of moving image data.

In a case where the recording start position of moving image data is determined in this way, the control unit 106 detects a sample point of audio data that corresponds to the recording start position of moving image data, and determines an AAU preceding the AAU containing this sample by one as the recording start position of audio sounds.

Although a moving image and an audio sound preceding the still-image recording instruction by n seconds are recorded in the simultaneous recording mode according to this embodiment, a still image may not be recorded, but moving images and audio sounds of n seconds before the recording instruction given by the user may be additionally recorded in a single file. Alternatively, similar processing may be carried out in a case where a new moving image and a new audio sound are additionally written to a moving image file already recorded on the recording medium 109.

Such an additionally writing mode is described below. In the additionally writing mode, moving images and audio sounds of n seconds from the recording instruction given by the user are recorded, and recording is thereafter stopped. The moving images and audio sounds of n seconds are additionally recorded in a single moving image file recorded in the recording medium 109 in the additionally writing mode.

FIG. 19 illustrates a flowchart of the operation in the additionally writing mode according to this embodiment. The operation in FIG. 19 is executed by the control unit 106 controlling the individual units. When the additionally writing mode is set in the recording standby state, as described above, the process of FIG. 19 starts.

First, the control unit 106 detects a moving image file recorded in the additionally writing mode from the recording medium 109, and detects the temporal difference between a moving image in moving image data and an audio sound at the end portion thereof when the moving image file is reproduced from the head thereof (S1901). The temporal difference is detected by a scheme similar to the one used in the process of S1406.

Next, the control unit 106 starts storing audio data from the audio obtaining unit 102 in the memory 103 (S1902). Audio data of the number of samples corresponding to the units of coding of at least two pieces of audio data only needs to be stored, and audio data of the two units of coding is repeatedly stored in the memory 103.

In this condition, the control unit 106 determines whether a recording start instruction is output (S1903). In a case where the recording start instruction is output, the control unit 106 determines a sample preceding the audio sample corresponding to the recording start instruction by the temporal difference detected in S1901 as the recording start position based on the temporal difference detected in S1901 (S1904). In a case where the recording head position of audio data is determined, the control unit 106 calculates the offsets of a moving image and an audio sound at the scene border, and stores the offsets in the memory 103 (S1905). Specifically, the control unit 106 determines whether the temporal difference calculated in S1901 is equal to or less than the reproduction time of one AAU. If the temporal difference is equal to or less than the reproduction time of one AAU, the control unit 106 stores the offset of an AAU next to the AAU at the recording head position in the moov so that the head AAU is not reproduced. Then, the offset information on the head AAU is stored in the moov as additional information. If the temporal difference is greater than the reproduction time for one AAU, on the other hand, the control unit 106 stores the AAU at the recording head position in the moov so that the head AAU is reproduced.

Then, the control unit 106 starts storing moving image data output from the image pickup unit 101 in the memory 103, and instructs the signal processing unit 105 to start coding moving image data and audio data (S1906). At this time, the control unit 106 instructs the signal processing unit 105 to start coding the moving image data from the frame that corresponds to the recording start instruction, and to start coding the audio data from the head position determined in S1904. Next, the control unit 106 instructs the recording reproducing unit 108 to add and record the coded moving image data and audio data to the specified moving image file. The recording reproducing unit 108 reads out the coded moving image data and audio data from the memory 103, and adds and records the moving image data and audio data to the moving image file to which data is added (S1907).

After recording starts in this manner, the control unit 106 determines whether n seconds have elapsed since the start of recording (S1908). If n seconds have elapsed since the start of recording, the control unit 106 stops coding and recording the moving image data and audio data (S1909). At this time, the recording stop positions of the moving image data and audio data are determined in such a way that the reproduction stop position of the audio sound precedes the reproduction stop position of the moving image data.

Next, the control unit 106 instructs the recording reproducing unit 108 to update the content of the management information moov of the additionally-written moving image file (S1910). As a result, the information on the newly recorded moving image data and audio data is added to the moov. Further, the offset information on the moving image and audio sound at the scene border stored in the memory 103 in S1905 is stored in the moov. In a case where the head AAU is not reproduced, the offset information on the head AAU is stored as additional information in the moov. In addition, the information on the temporal difference between the moving image and audio sound at the head of each scene, and the information on the temporal difference between the moving image and audio sound at the end portion of each scene are stored in the moov.

Part of the moving image file recorded in the above-mentioned additionally writing mode can be deleted. In this case, reduced images at the scene border are displayed on the display unit 104 based on the offset information on the scene border stored in the moov, and the scene corresponding to the reduced image selected by the user is deleted, from the head to the end portion, from the moving image file. After deletion, moving images and audio sounds preceding and following the deleted portion are combined in accordance with the operation illustrated in FIGS. 17A to 17F and FIG. 18.

According to the recording structure of the moving image file according to the present invention, even if combination of moving image files or partial deletion of a moving image file is executed after recording, unnatural reproduction due to non-coincidence of the reproduction timing of a moving image with the reproduction timing of an audio sound in the reproduction of the moving image file can be prevented.

This embodiment may be configured to permit a user to instruct start and stop of recording in the additionally writing mode so that moving images and audio sounds from the user's instruction to start recording to the user's instruction to stop recording may be recorded. This embodiment may be configured to permit a user to additionally write a moving image and an audio sound to a moving image file selected by the user from moving image files already recorded on the recording medium 109, in the additionally writing mode. Other configurations may be implemented. For example, a moving image file is selected immediately before the additionally writing mode is set.

Other Embodiments

The individual units constituting the above-mentioned recording apparatus according to the embodiment of the present invention, and the individual steps of the recording method can be achieved as a program stored in a RAM, ROM, or the like of a computer runs. This program and a computer readable storage medium storing the program are encompassed in the scope of the present invention.

The present invention may be embodied as, for example, a system, an apparatus, a method, a program, a storage medium, or the like. Specifically, the present invention may be adapted to a system that includes multiple devices, or an apparatus that includes a single device.

The present invention includes a case where a software program that achieves the functions of the above-mentioned embodiment is supplied directly or remotely to a system or an apparatus. The present invention also includes a case where the computer of the system or the apparatus reads out and executes the supplied program codes.

Therefore, the present invention is achieved by program codes themselves installed on the computer so that the computer achieves the functional processes of the present invention. That is, the present invention includes a computer program itself for achieving the functional processes of the present invention. In this case, the computer program may take any of forms, such as an object code, a program which is executed by an interpreter, or script data to be supplied to the OS, as long as the program has program functions.

Storage media for supplying a program include a flexible disk, a hard disk, an optical disc, and a magneto-optical disk. The storage media further include an MO, a CD-ROM, a CD-R, a CD-RW, magnetic tape, a nonvolatile memory card, a ROM, and a DVD (DVD-ROM, DVD-R).

In addition, methods of supplying a program include a method of connecting to a webpage over the Internet using a browser installed on a client computer. Alternatively, the computer program according to the present invention may be supplied by downloading the computer program itself or a file having the computer program compressed and provided with an auto-install function from the webpage onto a storage medium such as a hard disk.

Further, the computer program according to the present invention may be achieved by dividing the program codes making the program into multiple files and by downloading the files from different and respective webpages. That is, a WWW server that permits multiple users to download program files for achieving the functional processes of the present invention on a computer is included in the scope of the present invention.

As an alternative method, the program according to the present invention may be encrypted and stored on storage media such as a CD-ROM, and distributed to users, and a certain user who clears predetermined conditions is permitted to download key information to decrypt the encrypted program from a webpage over the Internet. Using the key information, the user can run the encrypted program to be installed on a computer to achieve the program of the present invention.

Further, a computer may execute the read-out program to achieve the functions of the above-mentioned embodiment. Further, the OS or the like that is running on a computer may execute the actual processes partly or entirely based on instructions from the program, thereby achieving the functions of the above-mentioned embodiment.

As a further method, first, a program read out from a storage medium is written in a memory provided on a function expansion board mounted on a computer, or a function expansion unit connected to a computer. Then, a CPU or the like mounted on the function expansion board or the function expansion unit executes the actual processes partly or entirely based on instructions from the program, thereby achieving the functions of the above-mentioned embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-276875, filed Dec. 19, 2012, which is hereby incorporated by reference herein in its entirety.

What is claimed is:

1. A recording apparatus, comprising:
   a moving-image obtaining unit for obtaining moving image data;
   an audio obtaining unit that obtains audio data;
   a coding unit that codes the obtained moving image data in accordance with a unit of coding which is a moving image sample corresponding to a first period, and coding the obtained audio data in accordance with a unit of coding which is an audio sample corresponding to a second period;
   a recording unit that stores the moving image data and audio data coded by the coding unit in a moving image file and records the moving image data and the audio data in a recording medium; and
   a control unit that determines a recording start position of the obtained audio data based on a recording start position of the obtained moving image data,
   wherein the control unit is configured to determine a position preceding the recording start position of the obtained moving image data by at least the audio sample corresponding to the second period as the recording start position of the obtained audio data, and determine a reproduction start position of the recorded audio data to be a position following a head of the recorded audio data by the unit of coding of the audio data.

2. A recording apparatus according to claim 1, wherein the recording apparatus has a first recording mode for causing the recording unit to generate a new moving image file to be recorded, and wherein in the first recording mode, the control unit determines the recording start position of the obtained audio data to be a position preceding the recording start position of the obtained moving image data by the audio sample corresponding to the second period.

3. A recording apparatus according to claim 1, wherein the recording apparatus has a second recording mode for adding new moving image data and audio data to the moving image file already recorded in the recording medium in accordance with an instruction to start recording, and wherein in the second recording mode, the control unit determines the recording start position of the obtained audio data to be a position preceding from a head of the moving image file recorded on the recording medium by a temporal difference between a reproduction end position of the moving image data and a reproduction end position of the audio data in a case where the moving image data and audio data are reproduced from the head of the moving image file.

4. A recording apparatus according to claim 3, wherein in the second recording mode, the control unit determines whether the temporal difference is greater than the second period, sets the reproduction start position of the obtained audio data to be a position following the head of the recorded audio data by the unit of coding of the audio data if the temporal difference is less than the second period, and sets the head of the recorded audio data as the reproduction start position if the temporal difference is greater than the second period.

5. A recording apparatus according to claim 1, further comprising a memory for storing the moving image data and audio data coded by the coding unit,
wherein in a recording standby state, the coding unit stores the coded moving image data and audio data of at least a predetermined period in the memory while sequentially coding the moving image data obtained by the moving-image obtaining unit and the audio data obtained by the audio obtaining unit; and
in accordance with a recording instruction in the recording standby state, the control unit controls the recording unit to add the coded moving image data of the predetermined period and the coded audio data of a period corresponding to the coded moving image data of the predetermined period to a predetermined moving image file recorded in the recording medium.

6. A recording apparatus according to claim 5, wherein the control unit sets an audio sample at a head of a unit of coding preceding, by one, the unit of coding of the audio data corresponding to a moving image sample preceding the moving image sample corresponding to the recording instruction by the predetermined period to the recording start position of the audio data.

7. A recording apparatus according to claim 6, wherein the control unit determines whether a temporal difference between a reproduction end position of moving image data and a reproduction end position of audio data, in a case where the moving image data and the audio data are reproduced from a head of the predetermined moving image file, is greater than the second period, sets the reproduction start position of the recorded audio data to be a position following the head of the recorded audio data by the unit of coding of the audio data if the temporal difference is equal to or less than the second period, and sets the head of the recorded audio data as the reproduction start position if the temporal difference is greater than the second period.

8. A recording apparatus according to claim 5, wherein the control unit determines the recording start position of the obtained moving image data in accordance with the recording instruction, and controls the coding unit until the recording instruction to repeatedly store an audio sample corresponding to a third period longer than at least the second period of the coded audio data in the memory.

9. A recording apparatus according to claim 1, wherein the control unit generates management information indicating the reproduction start position of the coded audio data, and stores the management information in the moving image file recorded by the recording unit, and further generates management information indicating that the recording start position of the obtained moving image data is a reproduction start position of the coded moving image data, and stores the generated management information in the moving image file.

10. A recording apparatus according to claim 9, wherein when coded moving image data and audio data stored in one moving image file recorded on the recording medium are combined with coded moving image data and audio data stored in another moving image file recorded on the recording medium, the control unit changes a reproduction start position of the coded audio data in the another moving image file in accordance with a temporal difference between a reproduction end position of the coded moving image data in the one moving image file and a reproduction start position of the coded audio data in the another moving image file combined to the coded audio data in the one moving image file.

11. A recording apparatus according to claim 9, wherein when one piece of coded moving image data and one piece of coded audio data are deleted from combined multiple pieces of coded moving image data and audio data, and coded moving image data and audio data immediately preceding and immediately following the deleted coded moving image data and audio data are respectively combined, the control unit changes a reproduction start position of the immediately following coded audio data combined to the immediately preceding coded audio data in accordance with a temporal difference between reproduction end positions of the coded moving image data and audio data immediately preceding the deleted coded moving image data and audio data, and a temporal difference between reproduction end positions of the coded moving image data and audio data immediately following the deleted coded moving image data and audio data.

12. A recording apparatus according to claim 1, wherein the control unit generates image data representing the coded moving image data to be stored in the moving image file to be recorded by the recording unit, and stores the image data in the moving image file; and
wherein the recording apparatus has a reproduction mode for displaying the image data stored in the moving image file on a display unit in accordance with a recording instruction, and reproducing the moving image file based on the displayed image data.

13. A recording method for recording by a recording unit moving image data obtained by a moving-image obtaining unit and audio data obtained by an audio obtaining unit, as a moving image file, in a recording medium, the recording method comprising:
a coding step of coding the obtained moving image data in accordance with a unit of coding which is a moving image sample corresponding to a first period, and coding the obtained audio data in accordance with a unit of coding which is an audio sample corresponding to a second period;
a recording step of storing, by the recording unit, the moving image data and audio data coded in the coding step in the moving image file and records the moving image data and the audio data in the recording medium; and
a control step of determining a recording start position of the obtained audio data based on a recording start position of the obtained moving image data,
wherein the control step comprising determining a position preceding the recording start position of the obtained moving image data by at least the audio sample corresponding to the second period as the recording start position of the obtained audio data, and determining a reproduction start position of the recorded audio data to be a position following a head of the recorded audio data by the unit of coding of the audio data.

14. A non-transitory computer-readable storage medium storing a program comprising a program code for causing a computer to execute the recording method according to claim 13.

* * * * *